United States Patent [19]

Tzikas et al.

[11] Patent Number: 5,081,296
[45] Date of Patent: Jan. 14, 1992

[54] BIS(β-HYDROXYETHYLTHIO)-$C_1$-$C_4$-ALKYLAMINES

[75] Inventors: Athanassios Tzikas, Pratteln; Paul Herzig, Basel, both of Switzerland

[73] Assignee: Ciba-Geigy Corporation, Ardsley, N.Y.

[21] Appl. No.: 510,384

[22] Filed: Apr. 17, 1990

Related U.S. Application Data

[63] Continuation of Ser. No. 248,872, Sep. 23, 1988, abandoned.

Foreign Application Priority Data

Sep. 24, 1987 [CH] Switzerland .......... 3699/87

[51] Int. Cl.$^5$ .................. C07C 317/06; C07C 381/00
[52] U.S. Cl. ....................... 564/166; 558/22; 558/25; 558/30; 558/61; 564/142; 564/501
[58] Field of Search ............. 534/618, 622, 629, 632, 534/635-638, 642-644; 558/25, 47, 61, 159, 142; 564/162, 163, 166, 500, 501

[56] References Cited

U.S. PATENT DOCUMENTS

| | | | |
|---|---|---|---|
| 4,754,023 | 6/1988 | Tzikas et al. | 534/618 |
| 4,766,206 | 8/1988 | Tzikas | 534/632 X |
| 4,786,721 | 11/1988 | Tzikas et al. | 534/622 X |

FOREIGN PATENT DOCUMENTS

| | | | |
|---|---|---|---|
| 60808 | 1/1983 | European Pat. Off. | 534/643 |
| 70806 | 1/1983 | European Pat. Off. | 534/622 |
| 76782 | 4/1983 | European Pat. Off. | 534/638 |
| 208655 | 1/1987 | European Pat. Off. | 534/643 |
| 210951 | 2/1987 | European Pat. Off. | 534/643 |
| 233139 | 8/1987 | European Pat. Off. | 534/643 |
| 1934047 | 2/1970 | Fed. Rep. of Germany | 534/643 |
| 1576237 | 10/1980 | United Kingdom | 534/643 |

*Primary Examiner*—Mary C. Lee
*Assistant Examiner*—Fiona T. Powers
*Attorney, Agent, or Firm*—George R. Dohmann; Edward McC. Roberts

[57] ABSTRACT

This application relates to intermediates useful for the preparation of fiber-reactive dyes, said intermediates having the formulae

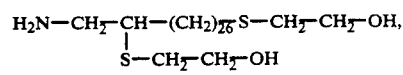

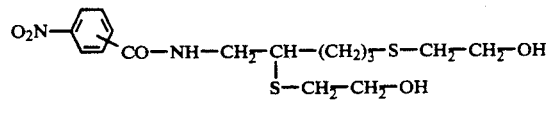

and

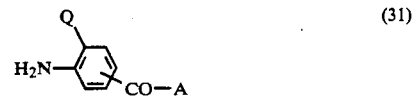

(31)

or

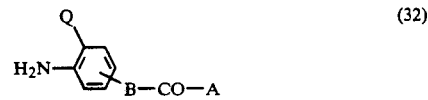

(32)

in which B is a —$(CH_2)_n$— or —O—$(CH_2)_n$— radical, where n is 1 to 6; Q is selected from the group consisting of hydrogen, $C_1$-$C_4$alkyl, $C_1$-$C_4$alkoxy, halogen, carboxyl and sulfo; and A is an amino substituent of the formula

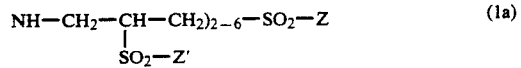

(1a)

and Z and Z', independently of one another, are β-sulfatoethyl, β-thiosulfatoethyl, β-phosphatoethyl, β-acyloxyethyl, β-haloethyl or vinyl.

5 Claims, No Drawings

BIS(β-HYDROXYETHYLTHIO)-$C_1$-$C_4$-ALKYLAMINES

This is a divisional of application Ser. No. 248,872, filed on Sept. 23, 1988, now abandoned.

The present application relates to novel improved reactive dyes, which are suitable in particular for the dyeing of cellulose-containing fibre materials by the processes customary for reactive dyes and produce wet-fast and light-fast dyeings; and also to processes for the preparation of these dyes and their use for the dyeing or printing of textile materials.

The invention relates to reactive dyes of the formula $$D-U-A)_{1-2} \quad (1)$$

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; U is a bridging link; A is an amino substituent of the formula

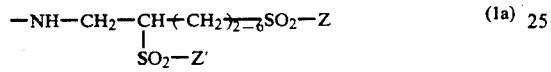

and Z and Z', independently of one another, are β-sulfatoethyl, β-thiosulfatoethyl, β-phosphatoethyl, β-acyloxyethyl, β-haloethyl or vinyl.

Radical D in formula (1) can contain, bound to its basic structure, the substituents customary for organic dyes.

Examples of further substituents in the radical D are: alkyl groups having 1 to 4 carbon atoms such as methyl, ethyl, propyl, isopropyl or butyl, alkoxy groups having 1 to 4 carbon atoms such as methoxy, ethoxy, propoxy, isopropoxy or butoxy, acylamino groups having 1 to 8 carbon atoms such as acetylamino, propionylamino or benzoylamino, amino, alkylamino having 1 to 4 carbon atoms such as methylamino, ethylamino, propylamino, isopropylamino or butylamino, phenylamino, N,N-di-β-hydroxyethylamino, N,N-Di-β-sulfatoethylamino, sulfobenzylamino, N,N-disulfobenzylamino, alkoxycarbonyl having 1 to 4 carbon atoms in the alkoxy radical such as methoxycarbonyl or ethoxycarbonyl, alkylsulfonyl having 1 to 4 carbon atoms such as methylsulfonyl or ethylsulfonyl, trifluoromethyl, nitro, cyano, halogen such as fluorine, chlorine or bromine, carbamoyl, N-alkylcarbamoyl having 1 to 4 carbon atoms in the alkyl moiety such N-methylcarbamoyl or N-ethylcarbamoyl, sulfamoyl, N-alkylsulfamoyl having 1 to 4 carbon atoms such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di-(β-hydroxyethyl)-salfamoyl, N-phenylsulfamoyl, ureido, hydroxyl, carboxyl, sulfomethyl or sulfo. Preferably, the radical D contains 1 or more sulfo groups. Reactive dyes of the formula (1), in which D is the radical of an azo dye, contain as substituents in particular methyl, ethyl, methoxy, ethoxy, acetylamino, benzoylamino, admino, chloro, bromo, ureido, hydroxyl, carboxyl, sulfomethyl or sulfo.

The bridging link U is, for example, an aliphatic, aromatic or heterocyclic radical; furthermore, U can also be composed of different of these radicals. The bridging link U contains a functional group to which the amino substituent A is bound. U can consist of only one of such a functional group by itself, for example in the case of a carbonyl group.

Suitable β-acyloxyethyl radicals for Z or Z' are in particular the β-acetoxyethyl radical and suitable β-haloethyl radicals are in particular the β-chlorethyl radical.

The radical —U—A is in particular a radical of the formula

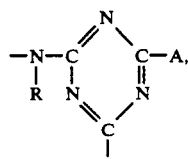

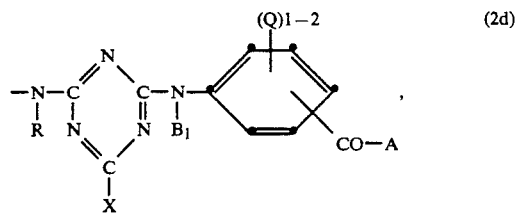

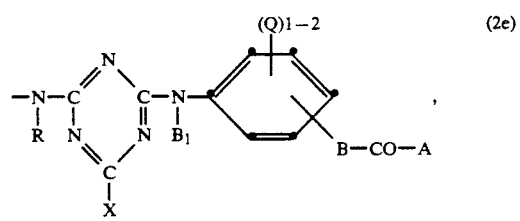

or

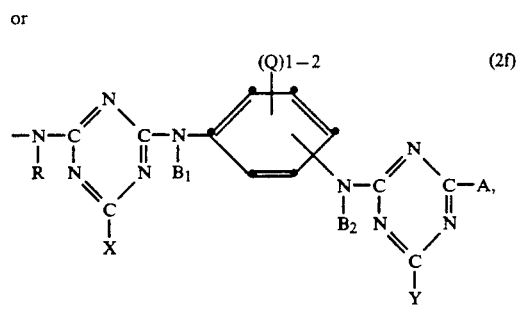

in which B is a —$CH_2)_n$ or —O—$CH_2)_n$ radical, where n is 1 to 6; R, $B_1$ and $B_2$, independently of one another, are hydrogen or alkyl having 1 to 4 carbon atoms, which can be substituted by halogen, hydroxyl, cyano, $C_1$-$C_4$alkoxy, $C_1$-$C_4$alkoxycarbonyl, carboxyl, sulfamoyl, sulfo or sulfato; and X and Y, independently of one another, are fluoro, chloro, bromo, sulfo, $C_1$-$C_4$alkylsulfonyl or phenylsulfonyl; Q is the 1 to 2 substituents from the group consisting of hydrogen, $C_1$-$C_4$alkyl, $C_1$-$C_4$alkoxy, halogen, carboxyl or sulfo; and A is as defined in formula (1).

The radical B contains 1 to 6, preferably 1 to 4, carbon atoms; examples of B are: methylene, ethylene, propylene, butylene, methyleneoxy, ethyleneoxy, propyleneoxy and butyleneoxy. Where B is a —O—($CH_2)_n$ radical, B is bound to D via an oxygen atom or in formula (2a) bound to the phenyl ring.

The radicals R, $B_1$ or $B_2$, where they are alkyl radicals, are straight-chain or branched; they can be further substituted, for example by halogen, hydroxyl, cyano, $C_1$-$C_4$alkoxy, $C_1$-$C_4$alkoxycarbonyl, carboxyl, sulfamoyl, sulfo or sulfato. Examples of R, $B_1$ and $B_2$ are the following radicals: methyl, ethyl, propyl, isopropyl, butyl, isobutyl, secbutyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably, R, $B_1$ or $B_2$ is hydrogen, methyl or ethyl.

The substituents X and Y detachable as anions are each a halogen atom such as fluorine, chlorine or bromine, a low-molecular-weight alkylsulfonyl group such as methylsulfonyl or ethylsulfonyl, the phenylsulfonyl radical or a sulfo group. Preferably, X and Y are fluoro or chloro.

The substituent Q is, for example, hydrogen, methyl, ethyl, propyl, isopropyl, butyl, isobutyl, sec-butyl, tert-butyl, methoxy, ethoxy, propyloxy, isopropyloxy, butyloxy, isobutyloxy, sec-butyloxy, tertbutyloxy, fluoro, chloro, bromo, carboxyl or sulfo. Preferably, Q is a sulfo group and its index is 1.

The —U—A radical can be present in the molecule once or twice; both formula variants are equally important. Where a dye of the formula (1) contains two such such formula moieties, these can be identical or different; preferably, they are identical. The amino substituent A has two reactive radicals, namely the groups —$SO_2$—Z and —$SO_2$—Z'; these reactive radicals contain a leaving group, for example where Z or Z' is β-chloroethyl, or they can become active in the manner customary for fibre-reactive groups, for example where Z or Z' is vinyl (for basic aspects of reactive dyes see Venkataraman, K.: The Chemistry of Synthetic Dyes. N.Y.: Academic Press 1972; Vol. VI, Reactive Dyes).

Further suitable examples of reactive dyes are those of the formula (1) in which the radical D comprises still another reactive radical. The additional reactive radicals contained in D can be bound to D via amino groups or in a different fashion, for example by a direct bond.

Preferred embodiments of the reactive dyes of the formula (1) are: a) Reactive dyes of the formula (1) in which A is a radical of the formula $$-NH-CH_2-\underset{\underset{SO_2-Z'}{|}}{CH}-(CH_2)_3-SO_2-Z \quad (1b)$$

and Z is Z', Z or Z' being as defined in formula (1).

Examples of corresponding amino substituents A are:
2,5-bis-β-chloroethylsulfonylpentylamino,
2,5-bis-β-sulfatoethylsulfonylpentylamino,
2,5-bis-vinylsulfonylpentylamino,
2,4-bis-β-chloroethylsulfonylbutylamino and
2,3-bis-β-chloroethylsulfonylpropylamino.
Preferably, A is one of the first three radicals mentioned.

b) Reactive dyes of the formula (1) in which —U—A is one of the radicals of the formulae (2c) to (2f), R is hydrogen, methyl or ethyl; $B_1$ and $B_2$ are hydrogen; Q is sulfo; and X and Y are fluorine or chlorine atoms.

The triazine substituents in formulae (2d) and (2e) preferably have the form

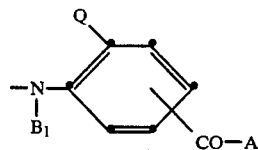

(2d')

and

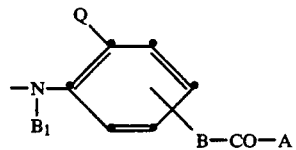

(2e')

in which A, B, $B_1$ and Q are as defined in the explanation of formulae (2a) to (2f).

The substituent Q is, for example, hydrogen, methyl, ethyl, propyl, isopropyl, butyl, isobutyl, sec-butyl, tert-butyl, methoxy, ethoxy, propyloxy, isopropyloxy, butyloxy, isobutyloxy, sec-butyloxy, tertbutyloxy, fluoro, chloro, bromo, carboxyl or sulfo.

Further preferred examples are as follows:
c) Reactive dyes of the formula (1) in which D is the radical of a mono or disazo dye.

d) Reactive dyes of the formula (1) in which D is the radical of a metal complex azo or formazan dye.

e) Reactive dyes of the formula (1) in which D is the radical of an anthraquinone dye.

f) Reactive dyes of the formula (1) in which D is the radical of a phthalocyanine dye.

g) Reactive dyes of the formula (1) in which D is the radical of a dioxazine dye.

h) Reactive dyes according to c) in which D is a mono or disazo dye radical of the formula $$D_1-N=N-(M-N=N)_sK- \quad (3a),$$

$$-D_1-N=N-(M-N=N)_sK \quad (3b),$$

or $$-D_1-N=N-(M-N=N)_sK- \quad (3c),$$

or of a metal complex derived therefrom; $D_1$ is the radical of a diazo component of the benzene or naphthalene series, M is the radical of a middle component of the benzene or naphthalene series and K is the radical of a coupling component of the benzene, naphthalene, pyrazolone, 6-hydroxy-2-pyridone or arylacetoacetamide series, it being possible for $D_1$, M and K to carry substituents customary for azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms; s is 0 or 1; and $D_1$, M and K together contain at least two sulfo groups, preferably three or four sulfo groups.

i) Reactive dyes according to c) in which D is a disazo dye radical of the formula $$D_1-N=N-K-N=N-D_2- \quad (4a),$$

or $$-D_1-N=N-K-N=N-D_2- \quad (4b),$$

$D_1$ and $D_2$, independently of one another, are the radical of a diazo component of the benzene or naphthalene series, and K is the radical of a coupling component of the naphthalene series, it being possible for $D_1$, $D_2$ and K to carry substituents customary for azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms; and $D_1$, $D_2$ and K together contain at least two sulfo groups, preferably three or four sulfo groups.

j) Reactive dyes according to d) in which D is the radical of a 1:1 copper complex azo dye of the benzene or naphthalene series and the copper atom is bound on both sides to one metallizable group each in the ortho-position relative to the azo bridge.

k) Reactive dyes according to d), in which D is the radical of a formazan dye of formula

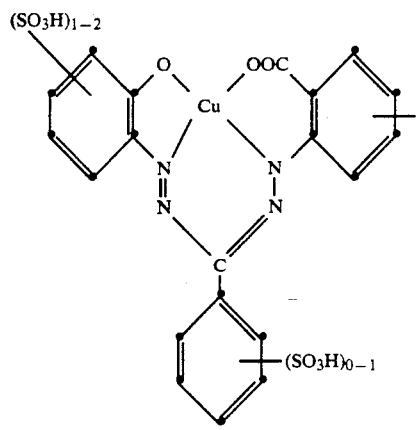

or

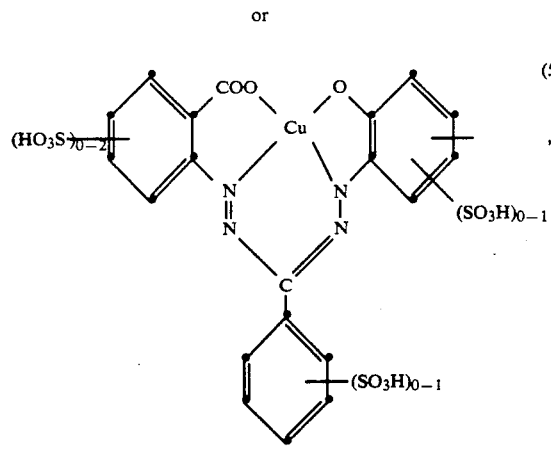

in which the benzene rings can be further substituted by alkyl having 1 to 4 C atoms, alkoxy having 1 to 4 C atoms, alkylsulfonyl having 1 to 4 C atoms, halogen or carboxyl.

l) Reactive dyes according to e) in which D is the radical of an anthraquinone dye of the formula

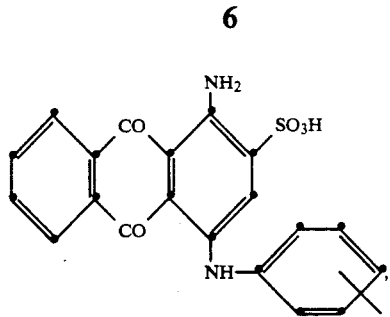

it being possible for the anthraquinone ring to be substituted by a further sulfo group and the phenyl radical to be substituted by alkyl having 1 to 4 C atoms, alkoxy having 1 to 4 C atoms, halogen, carboxyl or sulfo, and the dye preferably containing at least two strongly water-solubilizing groups.

m) Reactive dyes according to f) in which D is the radical of a phthalocyanine dye of the formula

Pc is the radical of a copper or nickel phthalocyanine; W is —OH and/or —$NR_1R_2$; $R_1$ and $R_2$, independently of one another, are hydrogen or alkyl having 1 to 4 carbon atoms, which can be substituted by hydroxyl or sulfo; $R_3$ is hydrogen or alkyl having 1 to 4 carbon atoms; E is a phenylene radical which can be substituted by alkyl having 1 to 4 C atoms, halogen, carboxyl or sulfo; or is an alkylene radical having 2 to 6 C atoms, preferably a sulfophenylene or ethylene radical; and k is 1 to 3.

n) Reactive dyes according to g) in which D is the radical of a dioxazine dye of the formula

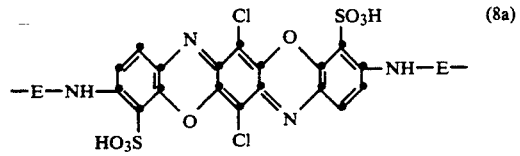

or

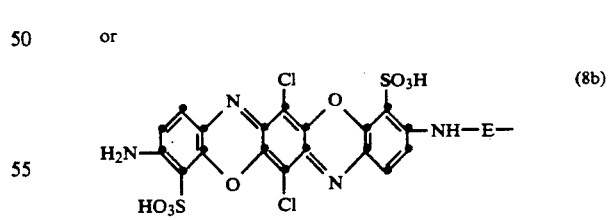

in which E is a phenylene radical which can be substituted by alkyl having 1 to 4 C atoms, halogen, carboxyl or sulfo; or is an alkylene radical having 2 to 6 C atoms; and the outer benzene rings in formulae (8a) and (8b) can be substituted by alkyl having 1 to 4 C atoms, alkoxy having 1 to 4 C atoms, acetylamino, nitro, halogen, carboxyl or sulfo.

Particular preference is given to reactive dyes according to h) or i) of the following formulae (9) to (25):

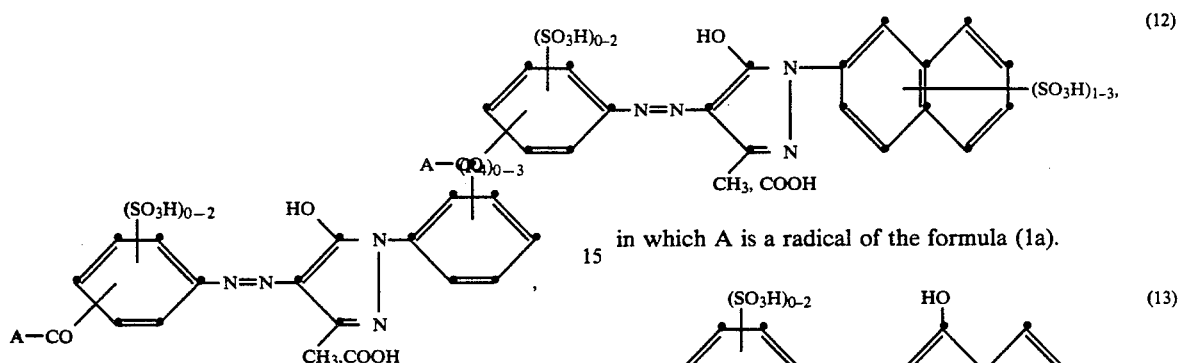

(9)

in which $R_4$ is 0 to 3 substituents from the group consisting of $C_1$-$C_4$alkyl, $C_1$-$C_4$alkoxy, halogen, carboxyl and sulfo, independently of one another; and A is a radical of the formula (1a).

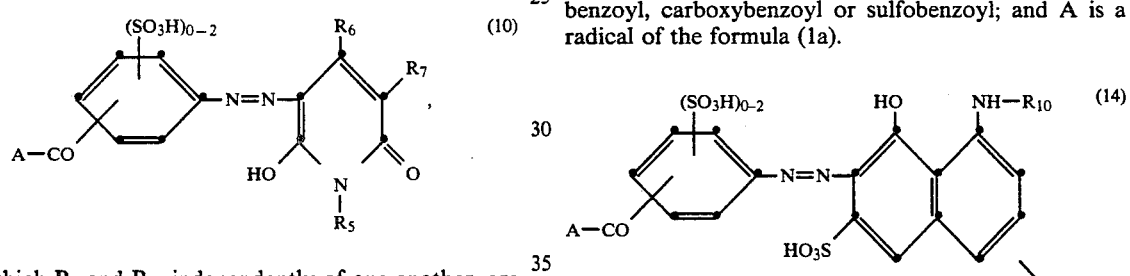

(10)

in which $R_5$ and $R_6$, independently of one another, are hydrogen, $C_1$-$C_4$alkyl or phenyl, and $R_7$ is hydrogen, cyano, carbamoyl or sulfomethyl; and A is a radical of the formula (1a).

(11)

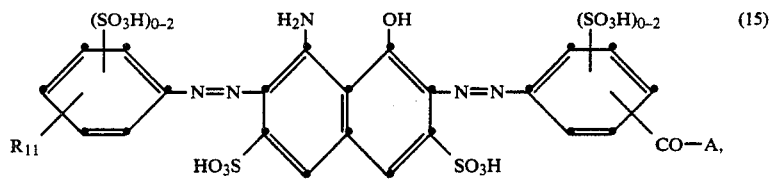

in which $R_8$ is 1 to 4 substituents from the group consisting of hydrogen, halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo, independently of one another; and A is a radical of the formula (1a).

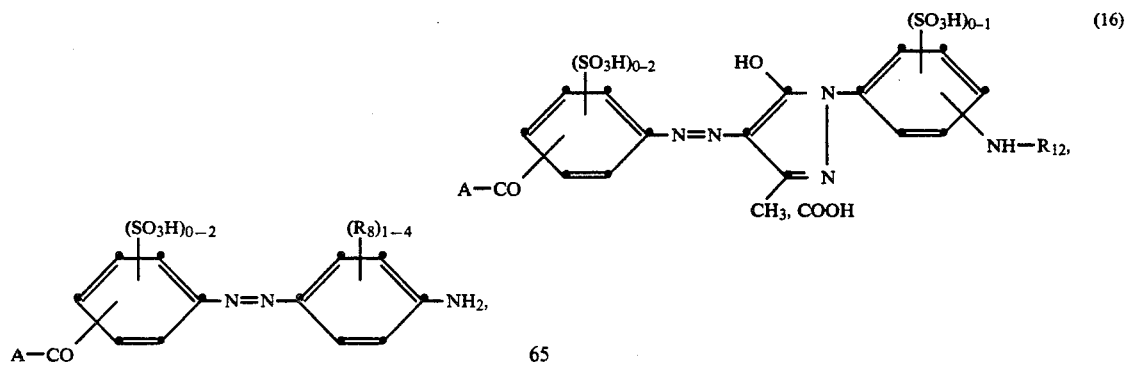

(12)

in which A is a radical of the formula (1a).

(13)

in which $R_9$ is $C_1$-$C_4$alkanoyl, carboxyl $C_1$-$C_4$alkanoyl, benzoyl, carboxybenzoyl or sulfobenzoyl; and A is a radical of the formula (1a).

(14)

in which $R_{10}$ is $C_1$-$C_4$alkanoyl or benzoyl; and A is a radical of the formula (1a).

(15)

in which $R_{11}$ is hydrogen, $\beta$-sulfatoethylsulfonyl or vinylsulfonyl; and A is a radical of the formula (1a).

(16)

in which $R_{12}$ is a halotriazine or halopyrimidine radical; and A is a radical of the formula (1a).

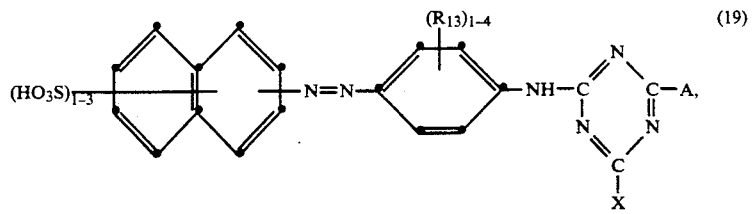

(17)

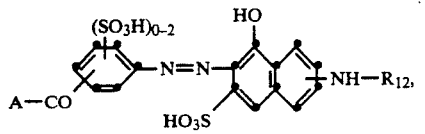

in which $R_{12}$ is a halotriazine or halopyrimidine radical; and A is a radical of the formula (1a).

in which $R_{12}$ is a halotriazine or halopyrimidine radical; and A is a radical of the formula (1a).

(19)

in which $R_{13}$ is 1 to 4 substituents from the group consisting of hydrogen, halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo, independently of one another; X is fluoro or chloro and A is a radical of the formula (1a).

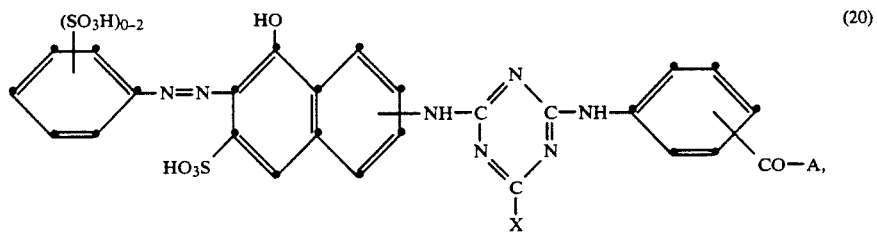

in which X is fluoro or chloro and A is a radical of the formula (1a).

(18)

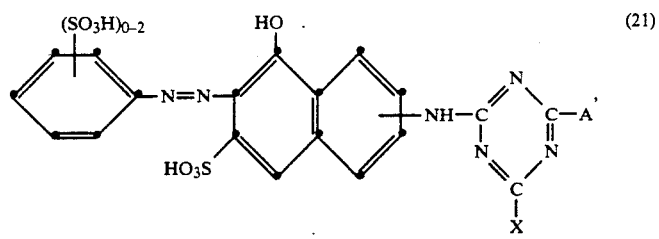

(21)

in which X is fluoro or chloro and A is a radical of the formula (1a).

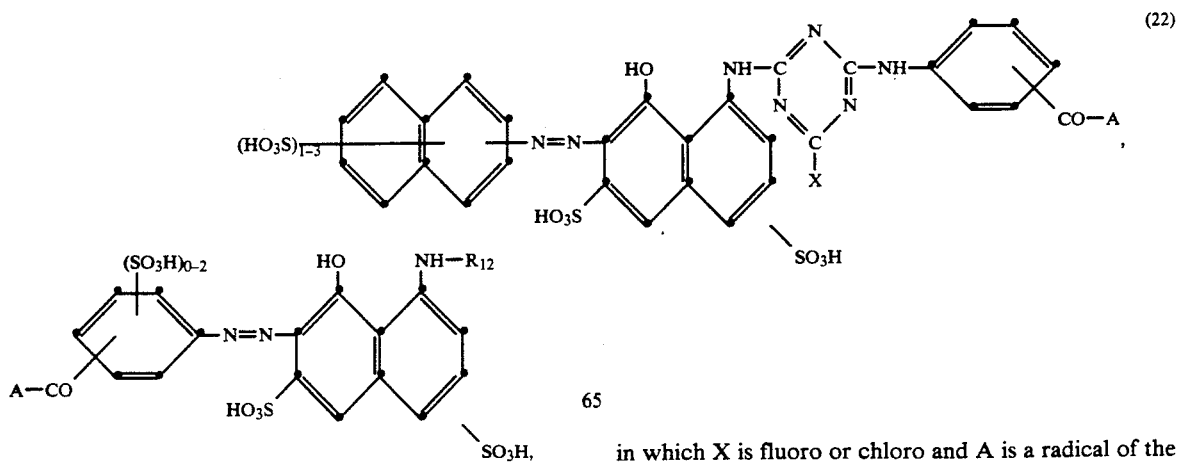

(22)

in which X is fluoro or chloro and A is a radical of the formula (1a).

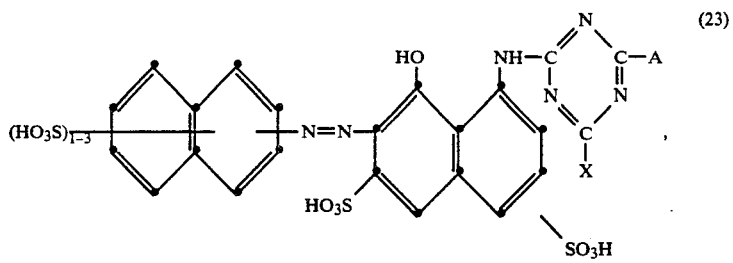

(23)

in which X is fluoro or chloro and A is a radical of the formula (1a).

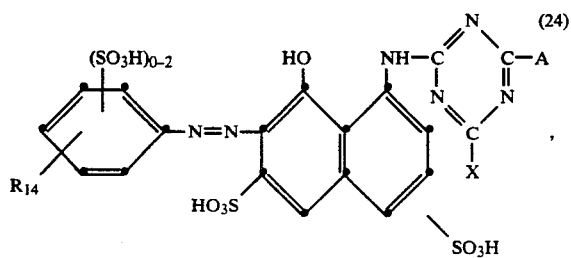

(24)

in which $R_{14}$ is hydrogen, β-sulfatoethylsulfonyl or vinylsulfonyl; X is fluoro or chloro and A is a radical of the formula (1a).

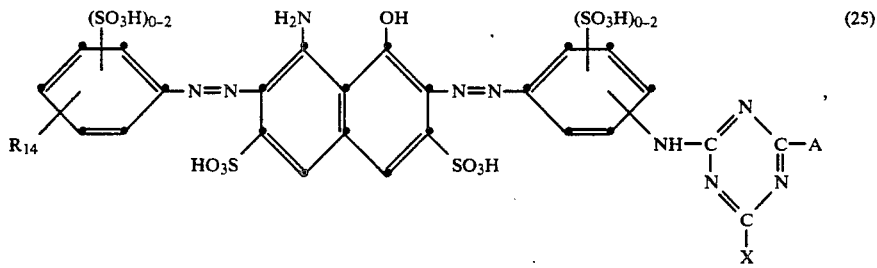

(25)

in which $R_{14}$ is hydrogen, β-sulfatoethylsulfonyl or vinylsulfonyl; X is fluoro or chloro and A is a radical of the formula (1a).

Preference is also given to heavy metal complexes of reactive dyes of the formula (1); complexing heavy metals are in particular copper, nickel, cobalt or chromium.

Particular preference is given to those reactive dyes of the formula (1) in which Z and Z' are the β-sulfatoethyl, β-chloroethyl or vinyl group and in which X or Y in formulae (2c) to (2f) is fluoro or chloro. Suitable examples are in particular also combinations of features according to the description above, if applicable.

A halotriazine radical $R_{12}$ in formulae (16) to (18) is preferably a monochloro- or monofluorotriazine radical containing a non-fibre-reactive substituent, for example —NH₂, β-sulfoethylamino, β-hydroxyethylamino, N,N-di-β-hydroxyethylamino, anilino, toluidino, sulfoanilino, morpholino, methoxy, isopropoxy or the like. Examples of a non-fibre-reactive substituent is in particular the radical of an aliphatic, aromatic or heterocyclic amine or alternatively the radical of a mixed aliphatic-/aromatic, aliphatic/heterocyclic or aromatic/heterocyclic amine. Examples are: alkylamino, N,N-dialkylamino, cycloalkylamino, N,N-di-cycloalkylamino, aralkylamino, arylamino groups, mixed substituted amino groups such as N-alkyl-N-cyclohexylamino and N-alkyl-N-arylamino groups, furthermore amino groups containing heterocyclic radicals which can have further condensed-on carbocyclic rings, and also amino groups in which the aminonitrogen atom is a member of a N-heterocyclic ring which can contain further hetero atoms. Where it is the radical of an aliphatic amine, suitable groups are preferably alkylamino or N,N-dialkylamino groups in which the alkyl chains can also be interrupted by different atoms or groups such as —O—, —NH— or —CO—. The alkyl radicals can be straight-chain or branched, of low molecular weight or high molecular weight, preferably they are alkyl radicals having 1 to 6 carbon atoms; suitable cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; amino groups in which the aminonitrogen atom is a member of a N-heterocyclic ring are preferably radicals of six-membered N-heterocyclic compounds which can contain nitrogen, oxygen or sulfur as further hetero atoms. The abovementioned alkyl, cycloalkyl, aralkyl and aryl radicals, the heterocyclic radicals and also the N-heterocyclic rings can additionally be further substituted, for example by halogen, such as fluoro, chloro and bromo, nitro, cyano, trifluoromethyl, sulfamoyl, carbamoyl, $C_1$-$C_4$alkyl, $C_1$-$C_4$alkoxy, acylamino groups such as acetylamino or benzoylamino, ureido, hydroxyl, carboxyl, sulfomethyl or sulfo.

The reactive dyes of the formula (1) are obtained by introducing into an organic dye having the radical D or into a dye precursor one radical or two radicals of the formula D, U and A being as defined in formula (1), or, in the case where dye precursors are used, by converting the intermediates obtained to the desired final dyes and, if desired, carrying out a further conversion reaction.

The molar ratio of the starting materials must be chosen in accordance with the composition of the final product, depending on whether only one radical or two radicals of the formula (1b) is to be present in the reactive dye of the formula (1).

If desired, a further conversion reaction is carried out subsequent to the process according to the invention. The final dyes are prepared from precursors especially by coupling which leads to azo dyes.

Since the individual abovementioned process steps can be carried out in a different order, some of them possible even at the same time, different process variations are possible. In general, the reaction is carried out stepwise in sequence, the order of the simple reactions between the individual reaction components advantageously being determined by the specific conditions.

The structure of the starting materials determines which of the possible process variations give the best results or under which specific conditions, for example at which condensation temperature, the reaction is carried out most advantageously.

Since, under certain conditions, hydrolysis of a halotriazine radical takes place, any intermediate which contains acetylamino groups has to be hydrolysed to cleave off the acetyl groups before it is condensed with a halotriazine. Which reaction, for example in the preparation of a secondary condensation product from a compound of the formula H—A, the triazine and the organic dye or a precursor is advantageously carried out first, the one of the triazine with the compound of the formula H—A or the one with the organic dye or a precursor of the dye, is different from case to case and is determined in particular by the solubility of the amino compounds involved and the basicity of the amino groups to be acylated.

A modified embodiment of the process consists in first preparing a dye containing a precursor of the reactive radical and afterwards converting this dye to the final product, for example by esterification or by an addition reaction. For example, a dye in which Z is a HO—CH$_2$CH$_2$— radical can be prepared, and the intermediate can be reacted before or after acylation with sulfuric acid to convert the hydroxyl group to the sulfato group; or an analogous dye in which Z is the H$_2$C=CH— group is used, and thiosulfuric acid is added onto the intermediate to give a HO$_3$SS—CH$_2$CH$_2$— radical. The sulfation of the hydroxyl group in a dye of the formula (1) or in a suitable precursor is carried out, for example, by reaction with concentrated sulfuric acid at 0° C. up to a moderately elevated temperature. The sulfation can also be carried out by reaction of the hydroxyl compound with two equivalents of chlorosulfonic acid per hydroxyl group in a polar organic solvent, for example N-methylpyrrolidone, at 10° to 80° C. Preferably, the sulfation is carried out by stirring the corresponding compound into sulfuric acid monohydrate at temperatures between 5° and 15° C. The introduction of a different radical for Z into a compound of the formula (1) or an intermediate instead of a halogen atom or the sulfato group, for example of a thiosulfato or phosphato group, is carried out in a manner known per se. The preparation via an intermediate of the reactive radical proceeds in many cases completely and leads to a uniform product. In addition, elimination reactions can be carried out subsequently to the synthesis. For example, reactive dyes of the formula (1), which contain sulfatoethylsulfonyl radicals, can be treated with dehydrohalogenating agents such as sodium hydroxide, which converts the sulfatoethylsulfonyl radicals to vinylsulfonyl radicals.

In some cases, a process variant can be used in which the starting materials are dye precursors. This variant is suitable for the preparation of reactive dyes of the formula (1) in which D is the radical of a dye composed of two or more than two components, for example of a monoazo, disazo, trisazo, metal complex azo, formazan or azomethine dye.

As a general rule, the reactive dyes of the formula (1) of all classes of dye can be prepared in a manner known per se or analogously to known procedures by starting with precursors or intermediates for dyes which contain fibre-reactive radicals according to formula (1), or by introducing these fibre-reacative radicals into intermediates suitable for this purpose which have the characteristic feature of dyes.

Preference is given to reactive dyes of the formula (1) in which D is the radical of a mono or disazo dye or of a metal complex azo dye. In this case, the radicals of the formula (1b) are bound to the diazo and/or coupling components. In the case where two radicals of the formula (1b) are present in a reactive dye of the formula (1), one radical each of the formula (1b) is preferably bound to one component, that is, to a diazo component or coupling component. Thus, the reactive dyes have, for example, the formulae

A—U—D$_1$—N=N—K          (26)

D$_1$—N=N—K—U—A          (27)

and

A—U—D$_1$—N=N—K—U—A      (28)

in which D$_1$ is the radical of a diazo component and K is the radical of a coupling component.

Starting from dye precursors, reactive dyes of the formula (1) are obtained, for example, by condensing a component of the dye of the formula (1) containing a —N(R)H group with a triazine then condensing the product with a compound of the formula H—A, or vice versa, and reacting the resulting product with the other component of the dye of the formula (1). In the preparation of the preferred azy dyes, the diazo components and the coupling components together must contain at least one amino group —N(R)H, although they can contain more than one amino group. In this case, the diazo components used are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If necessary, the corresponding acetylamino or nitro compounds in which the acetylamino or nitro group is converted to the H$_2$N group by hydrolysis or reduction before the condensation with the triazine are used.

In the case where in the reactive dyes prepared groups are present which are capable of forming metal complexes, such as hydroxyl, carboxyl, amino or sulfo groups, it is also possible to metallize the reactive dyes afterwards. For example, metal complex azo dyes are obtained by treating azo compounds obtained according to the invention and containing complexing groups in the ortho-, ortho'-position relative to the azo bridge, for example hydroxyl or carboxyl groups, before or possible even after the condensation with the triazine with heavy-metal-donating agents. Of specific interest are copper complexes of reactive dyes of the formula (1). A possible method of metallization, in addition to the abovementioned method, is also the dealkylating metallization and, for the preparation of copper complexes, the oxidative coppering.

The most important process variations are described in the use examples.

Possible starting materials which can be used for the preparation of the reactive dyes of the formula (1) will be named individually below.

Organic dyes for the preparation of reactive dyes of the formulae (16) to (25) etc.

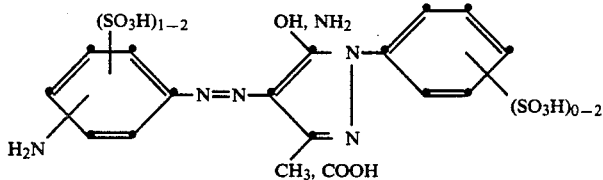

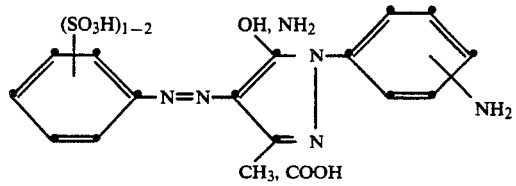

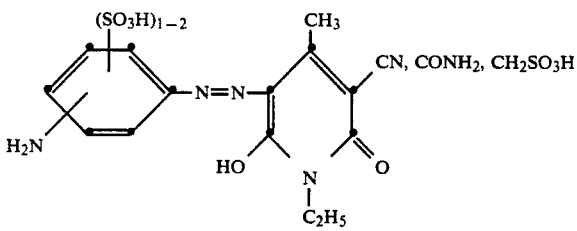

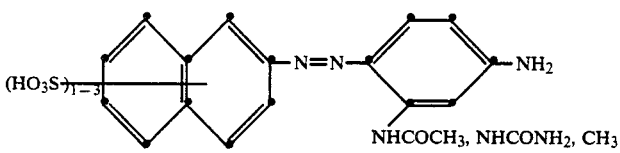

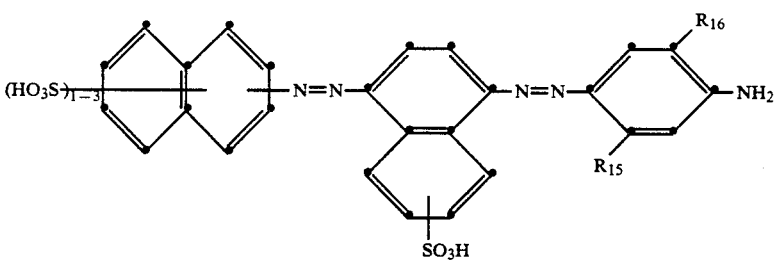

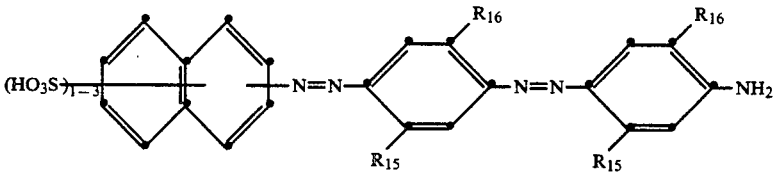

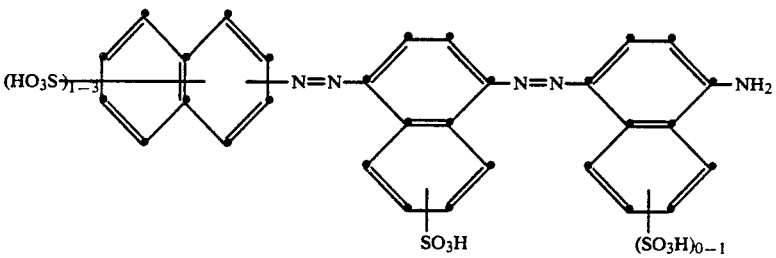

-continued
Organic dyes for the preparation of reactive dyes of the formulae (16) to (25) etc.
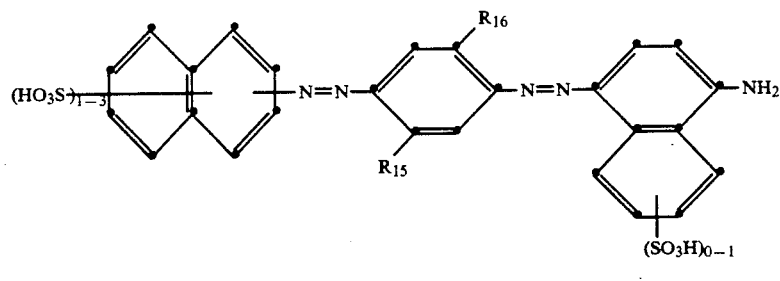
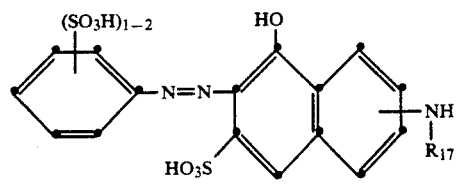
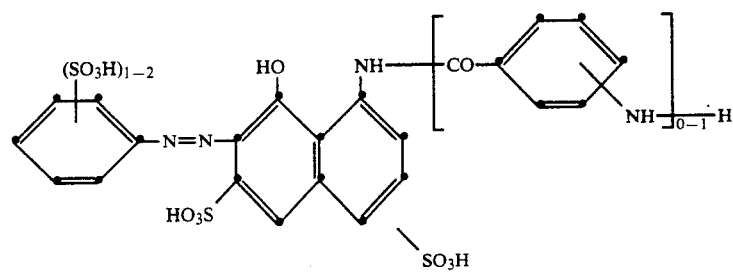
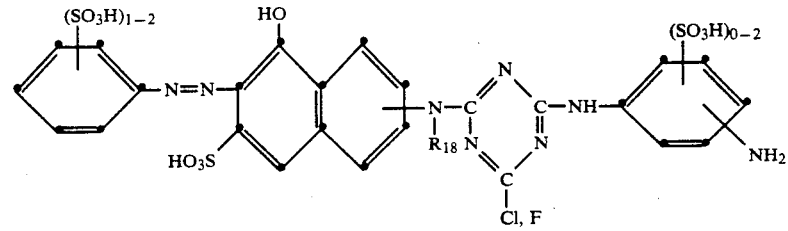
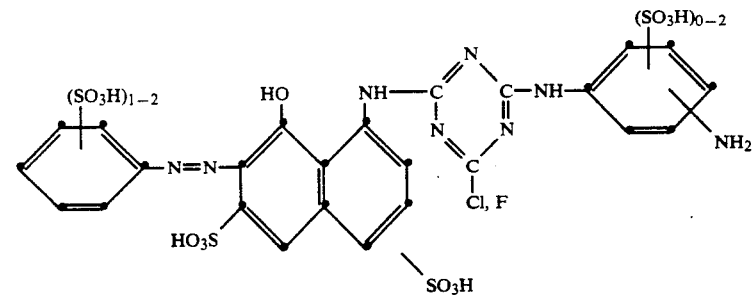
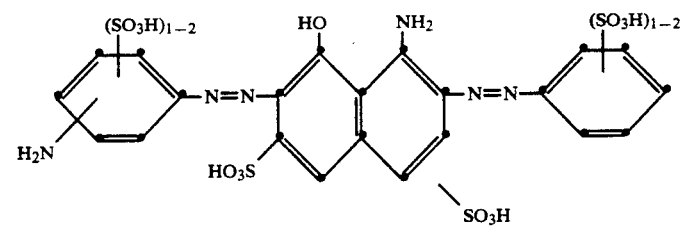

-continued
Organic dyes for the preparation of reactive dyes of the formulae (16) to (25) etc.
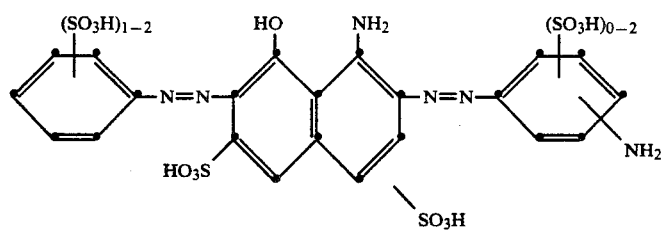
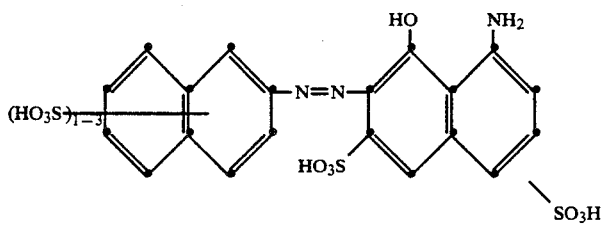
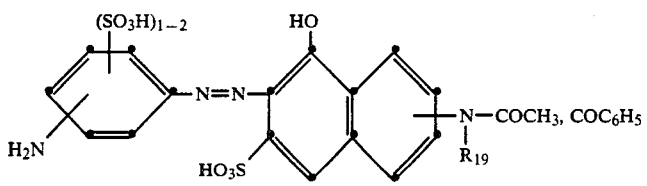
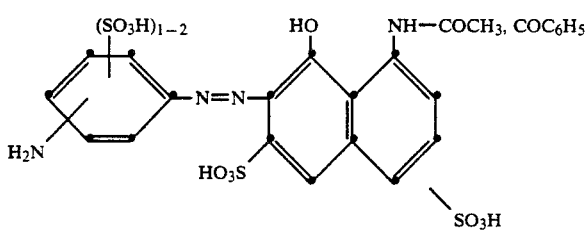
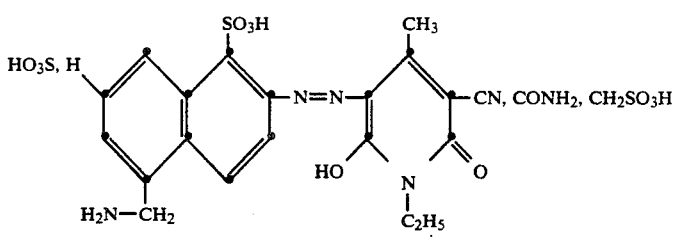
Metal complexes of dyes of the formulae:
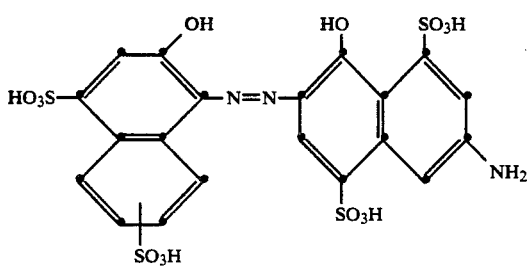

-continued
Organic dyes for the preparation of reactive dyes of the formulae (16) to (25) etc.
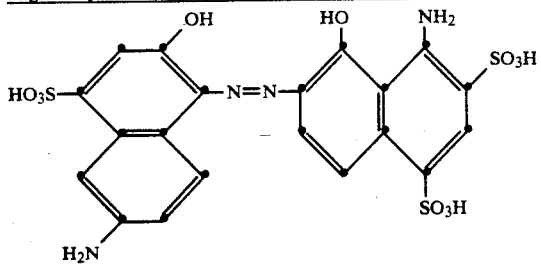
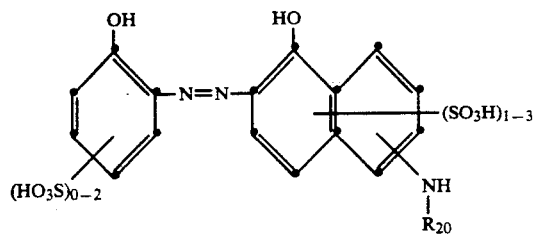
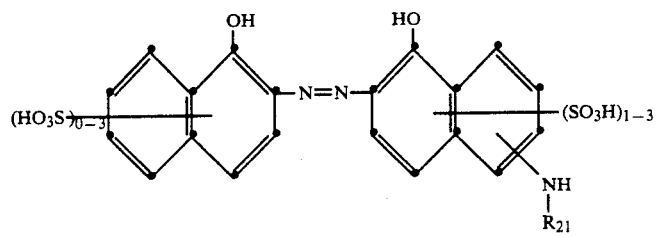
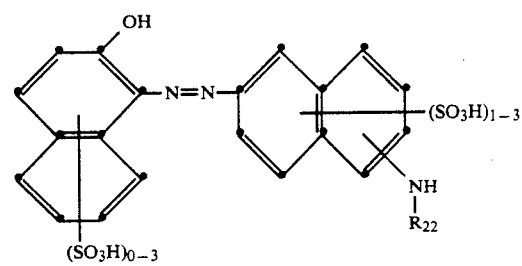
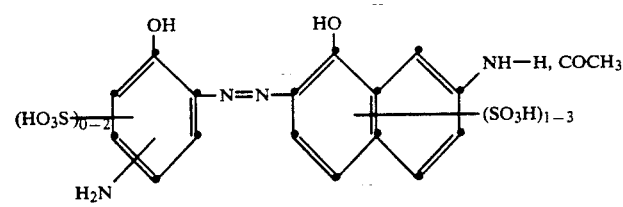
Preferably, the metal atoms are Cu(1:1 complex) or Cr and Co (1:2 complex). Cr and Co complexes can contain the azo compound of the abovementioned formula once or twice, that is, they can have a symmetrical or, containing any other desired ligands, an unsymmetrical structure.
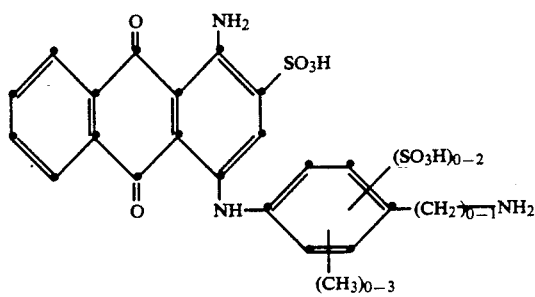

-continued
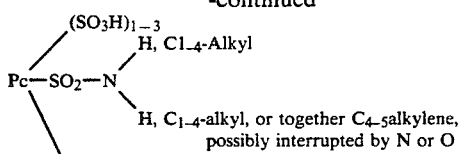
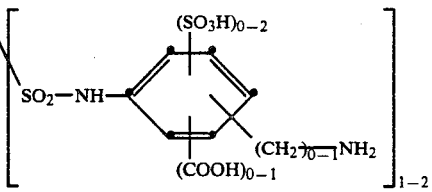
In this formula, Pc is the Cu or Ni phthalocyanine radical and the total number of substituents on the Pc skeleton is 4.
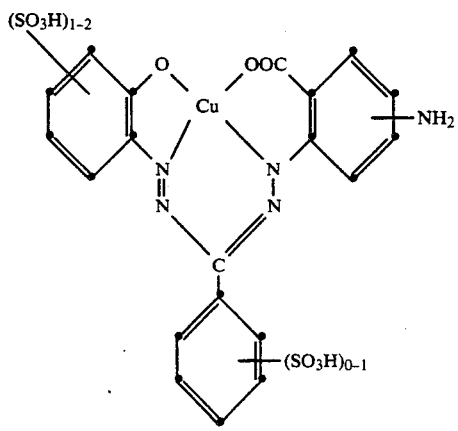
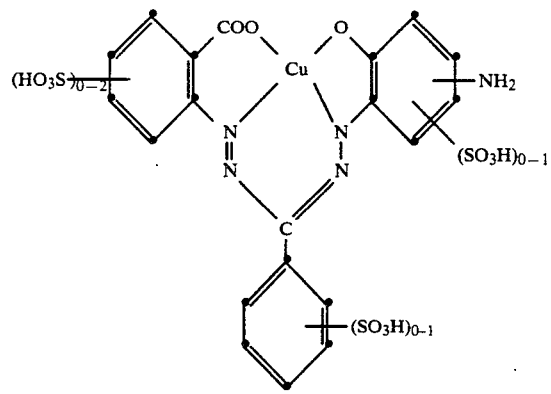
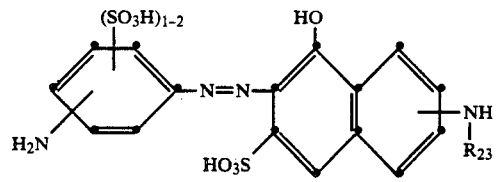
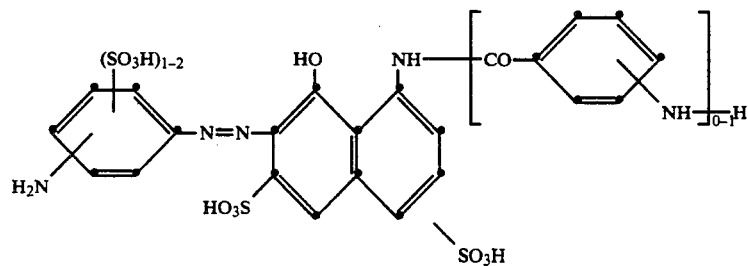

-continued
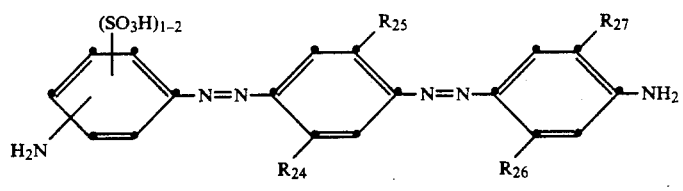
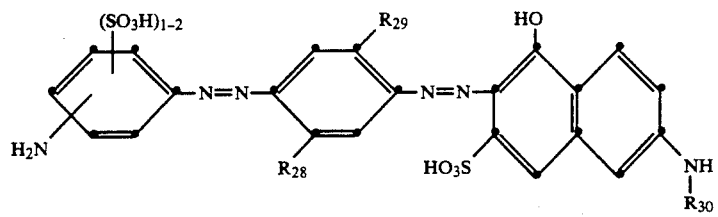
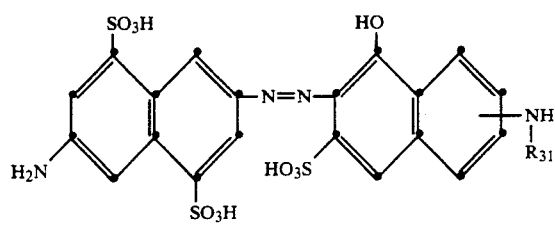
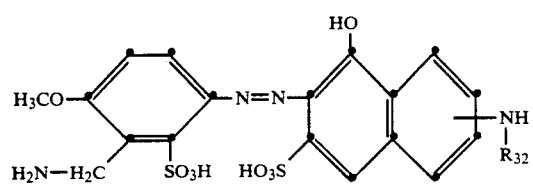
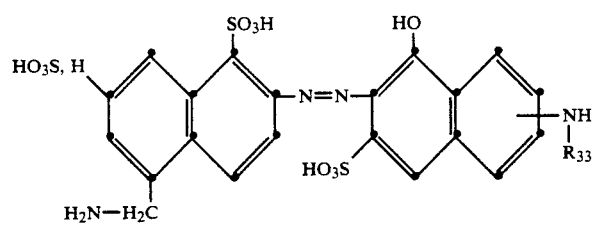
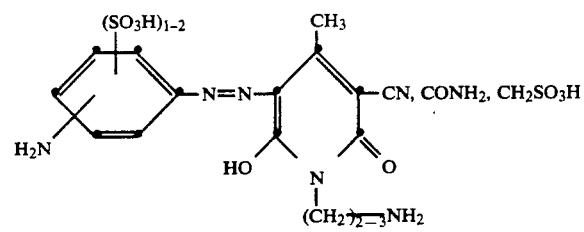
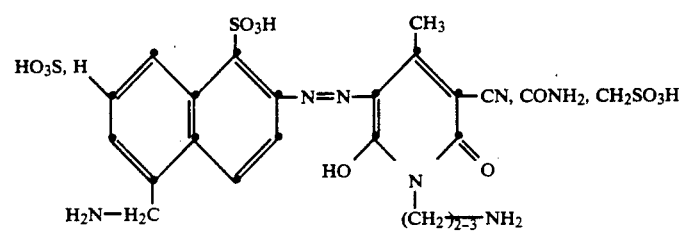

-continued
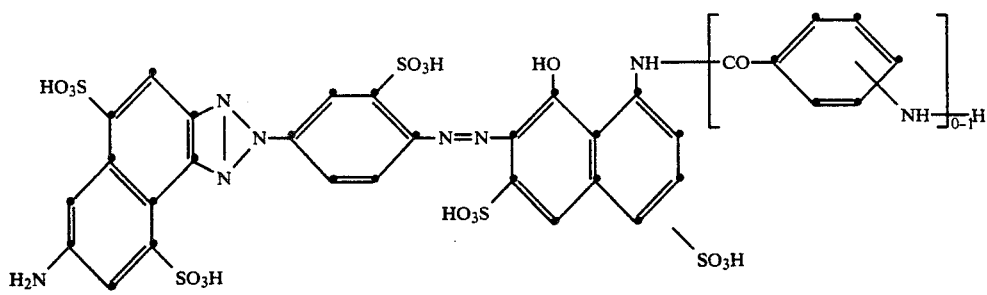
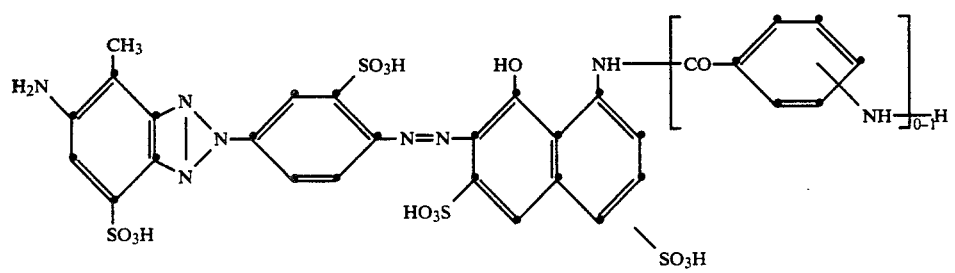
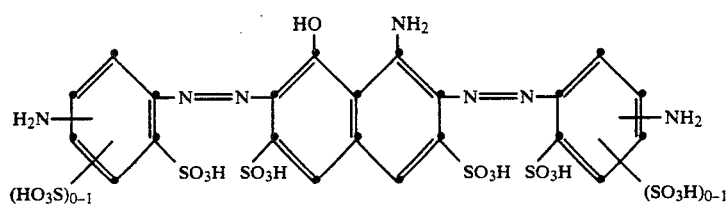
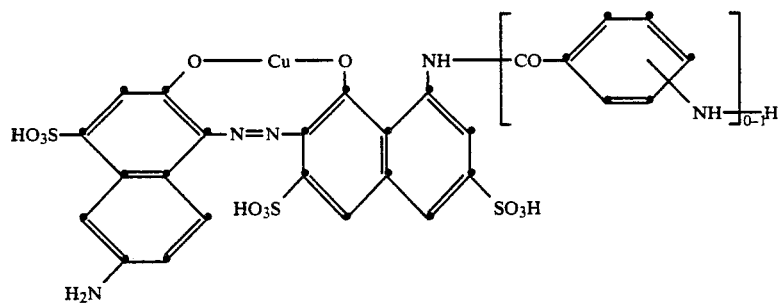
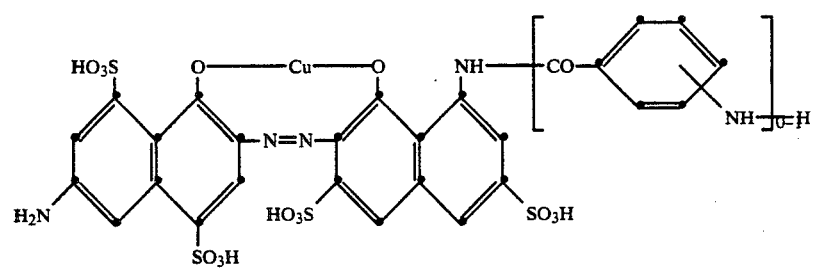
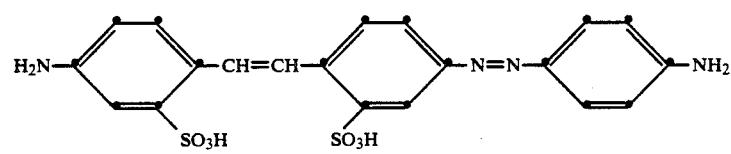

-continued

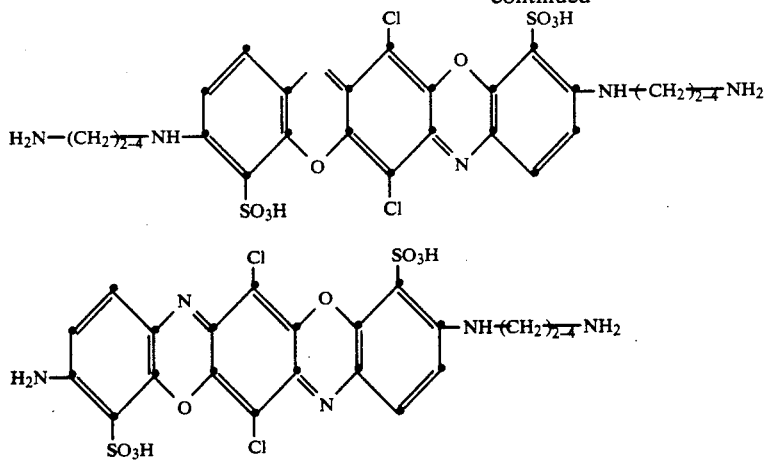

In the formulae listed above, the radicals $R_{17}$ to $R_{23}$ and $R_{30}$ to $R_{33}$ are hydrogen or $C_1$–$C_4$alkyl, $R_{29}$ are hydrogen, $C_1$–$C_4$alkyl, $C_1$–$C_4$alkoxy, $C_1$–$C_4$alkanoylamino, ureido or halogen, the radicals $R_{15}$, $R_{16}$ etc. which belong to one and the same formula are independent from one another. Preferably, the radicals $R_{17}$ to $R_{23}$ and $R_{30}$ to $R_{33}$ are hydrogen, methyl or ethyl, and the radicals $R_{15}$, $R_{16}$ and $R_{24}$ to $R_{29}$ are hydrogen, methyl, ethyl, methoxy, ethoxy, acetylamino, ureido or chloro. The aromatic rings in the oxy, ethoxy, acetylamino, ureido or chloro. The aromatic rings in the above dyes can be further substituted, the benzene rings in particular by methyl, ethyl, methoxy, ethoxy, methylsulfonyl, ethylsulfonyl, and the radicals $R_{15}$, $R_{16}$ and $R_{24}$ to carboxyl, acetylamino or chloro, and the naphthalene rings in particular by methoxy, carboxyl, acetylamino, nitro or chloro; the same applies to the anthraquinones, dioxazines etc. Preferably, the benzene rings are not further substituted.

Individual diazo and coupling components are as follows:

Diazo components

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonamide and the N-methyl, N-ethyl, N,N-dimethyl or N,N-diethyl derivatives thereof, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-1,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8-or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1-diamino-2-methoxybenzenes 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3- diaminobenzene-4-sulfonic acid, 1,3-diaminobenzene-4,6-sulfonic acid, 1,4-diamino-2-chlorobenzene-5-sulfonic acid, 1,4-diamino-2-methylbenzene-5-sulfonic acid, 1,5-diamino-6-methylbenzene-3-sulfonic 1,4-diamino-2-ethoxybenzene, acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 4,4'-diaminodiphenyloxide, 4,4'-diaminodiphenylurea-2,2'-disulfonic acid, 4,4'-diaminodiphenyloxyethane-2,2'disulfonic acid, 4,4'-diaminostilbene-2,2'-disulfonic acid, 4,4'-diaminodiphenylethane-2,2'-disulfonic acid, 2-amino-5-amino-methylnaphthalene-1-sulfonic acid, 2-amino-5-aminomethylnaphthalene-1,7-disulfonic acid and 1-amino-4-methoxy-5-aminomethylbenzene-6-sulfonic acid.

In the case where the diazo component to be used is, instead of a diamine, an aminoacetylamino compound from which the acetyl group is afterwards again cleaved off by hydrolysis, such as has been described above in the explanations of the process variants, the monoacetyl compounds of the abovementioned diazo components can be used, for example 1-acetylamino-3-aminobenzene-4-sulfonic acid or 1-acetyl-amino-4-aminobenzene-3-sulfonic acid.

Coupling components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminoaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,6-disulfonic acid, 1-amino-8-hydroxynaphthalene-2,4,6-trisulfonic acid, 1-hydroxy-8-acetylaminonaphthalene-3-sulfonic acid, 1-benzolyamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- and 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- and -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- and -4,6-disulfonic acid, 1-acetylamino-8-hydroxynaphthalene-3,6- and -4,6-disulfonic acid, 1-(4'-aminobenzoylamino)-8-hydroxynaphthalene-3,6- and -4,6-disulfonic acid, 1-(4'-nitrobenzoylamino)-8-hydroxynaphthalene-3,6- and -4,6-disulfonic acid, 1-(3'-aminobenzoylamino)-8-hydroxynaphthalene-3,6- and -4,6-disulfonic acid, 1-(3'-nitrobenzoylamino)-8-hydroxynaphthalene-3,6- and -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'sulfophenyl)-5-pyrazolone-3-carboxylic acid, 1-(4',8'-disulfonaphthyl-[2'])-3-methyl-5-pyrazolone, 1-(5',7'-disulfonaphthyl-[2'])-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenezene-5-sulfonic acid, 4-hydroxy-2-quinolone, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)naphthalene-3,6-disulfonic acid, 1-β-aminoethyl-3-cyano-4-methyl-6-hydroxy-2-pyridone, 1-γ-aminopropyl-3-sulfomethyl-4-methyl-6-hydroxy-2-pyridone, 1,3-diaminobenzene, 1-amino-3-N,N-di-β-hydroxyethylaminobenzene, 1-amino-3-N,N-di-β-sulfatoethylaminobenzene, 1-amino-3-N,N-dihydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene.

Triazines 2,4,6-Trifluoro-s-triazine (cyanuric fluoride), 2,4,6-trichloro-s-triazine (cyanuric chloride) 2,4,6-tribromo-s-triazine (cyanuric bromide), 2,4,6-trisulfo-s-triazine, 2,4,6-tris(methylsulfonyl)-s-triazine, 2,4,6-tris(phenylsulfonyl)-s-triazine.

Amines of the formula H-A

The invention further relates to amines H—A which conform to the formula

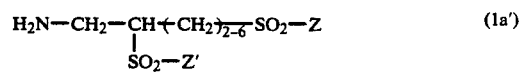

in which Z and Z' are as defined in formula (1a) and also to their precursors, the corresponding bis(β-hydroxyethyl)thioether compounds.

Perference is given to amines of the formula

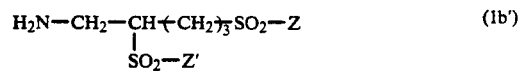

in which Z is preferably Z'.

The compounds of the formula (1a') and (1b') are prepared by reacting a suitable dihaloaminoalkane with mercaptoethanol and oxidizing the resulting bis(β-hydroxyethylthio)aminoalkane with elemental chlorine to the corresponding bis(β-chloroethylsulfonyl-)aminoalkane, if desired converting the β-chloroethyl groups into other Z or Z' radicals. The preparation of the compound of the formula (1b') in which Z and Z' is chloro is described in Example 1.

The compounds of the formulae

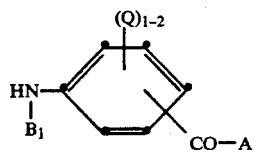
(29)

and

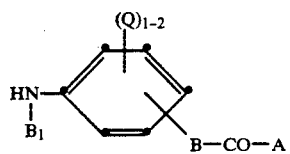
(30)

in which B, B₁, Q and A are as defined in formulae (2a) to (2f) can be prepared by condensing appropriate nitorphenylcarbonyl chlorides or nitrophenylalkanoyl- or nitrophenoxyalkanoyl chlorides with amines of the formula H—A and reducing the nitro group to the amino group.

The reaction is preferably carried out in a high-boiling organic solvent, for example nitrobenzene. The reduction of the nitro group to the amino group is carried out in a manner known per se by catalytic hydrogenation using Pd/carbon in ethanol, ethyl acetate or tetrahydrofuran at room temperature up to about 40° C. The reduction can also be carried out using Fe/hydrochloric acid or Fe/acetic acid in aqueous solution.

The corresponding hydroxyethylthioether compounds, which can also be used as intermediates, can be prepared by condensing the acid chloride with a dihaloalkylamine and heating the condensation product with 2-mercaptoethanol and sodium alcoholate in alcohol. The thioether compounds are then additionally oxidized to the corresponding sulfones.

The oxidation of the thioether compounds to the sulfones can be carried out by various methods, for example using hydrogen peroxide with or without the addition of tungsten or vanadium compounds as catalysts, furthermore using peracetic acid, potassium permanganate, potassium persulfate or chromic acid, or using chlorine/hydrochloric acid, all of these in an aqueous, aqueous-organic or organic medium.

The amines or carboxylic amides thus obtained, in which the grouping —SO₂—Z or —SO₂—Z' is a β-hydroxyethylsulfonyl group, can be converted by treatment with sulfating agents, phosphorylating agents, halogenating agents, alkyl- or arylsulfonyl halides, alkyl- or arylcarbonyl halides or alkyl- or arylcarboxylic anhydrides to the corresponding dye precursors, in which the grouping —SO₂—Z is, for example, the grouping —SO₂—CH₂—CH₂—O—SO₃H, —SO₂—CH₂—CH₂—O—PO₃H₂, —SO₂—CH₂—CH₂—halogen, —SO₂—CH₂—CH₂—O—CO—CH₃ or —SO₂—CH₂—CH₂—O—CO—C₆H₅. The products thus obtained can, in turn, be converted by treatment with alkalis, for example alkali metal hydroxide or alkali metal carbonate such as sodium hydroxide or sodium carbonate to the corresponding compounds in which the grouping —SO₂—Z is the grouping —SO₂—CH=CH₂. The products thus obtained can again be converted by reaction (additon) with salts of thiosulfuric acid such as sodium thiosulfate to compounds in which the grouping —SO₂—Z is the grouping —SO₂—CH₂—CH₂—S—SO₃H.

Suitable sulfating agents for this reaction are, for example, concentrated sulfuric acid and also chlorosulfonic acid and sulfamic acid or other compounds donating sulfur trioxide. Suitable phosphorylating agents for this reaction are, for example, concentrated phosphoric acid, pyro-, meta- or polyphosphoric acid, alkyl polyphosphates, phosphorus oxychloride or mixtures of phosphoric acid and phosphorus(V) oxide. The halogenating agents used can be, for example, thionyl chloride or thionyl bromide.

Preference is given to compounds of the formula

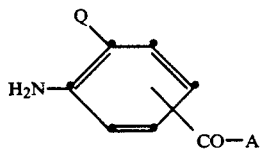
(31)

and

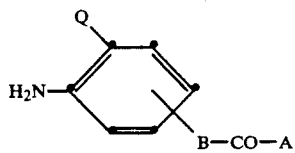
(32)

in which B, Q and A are as defined in the explanation of the formulae (2a) to (2f).

According to a modification of the process described above, compounds of the formulae (29) to (32) can also be prepared by condensing a nitrophenylcarbonyl chloride or nitrophenyl- or nitorphenoxyalkanoyl chloride with an intermediate formed in the synthesis of the amine of the formula H—A, that is, the corresponding dihydroxydithioether compound. The condensation product is subsequently oxidized with elemental chlorine to the corresponding β-chloroethylsulfonyl compound, and the nitro group is reduced to the amino group.

Furthermore, another additional process variant can be used, according to which the intermediate obtained is first oxidized with a peroxide to the sulfone, the nitro group is then reduced to the amino group, and finally the hydroxyl groups in the amine radical are sulfated.

The condensation of the acid chlorides with the amines of the formula H—A or intermediates thereof is carried out, for example, in chloroform or toluene at room temperature and in the presence of alkaline acid-binding agents, for example alkali metal hydroxides, alkali metal carbonates or alkali metal bicarbonates. The condensation product is subsequently oxidized in a manner known per se using a chlorine/hydrochloric acid mixture. The reduction of the nitro group to the amino group is carried out as described above.

The preferred reactive dyes of the formulae (19) to (25) are prepared by stepwise condensation and coupling.

The condensation of an s-triazine, in particular of a 2,4,6-trihalo-s-triazine, with the organic dyes or the components which contain an —N(R)H group and are diazotizable and/or are capable of coupling is preferably carried out in aqueous solution or suspension at low temperatures, preferably between 0° and 5° C., and at a weakly acid, neutral to weakly alkaline pH. Advantageously, the hydrogen halide eliminated in the condensation is constantly neutralized by the addition of aqueous alkali metal hydroxides, alkali metal carbonates or alkali metal bicarbonates. For the further reaction of the halotriazine dyes thus obtained or for the reaction of the 2,4,6-trihalo-s-triazine with the amines of the formula H—A or the compounds of the formulae (29) to (32), the free amines or salts thereof, preferably in the form of the hydrochloride, are used. The reaction is carried out at temperatures such as between 0° and 40° C., preferably between 5° and 25° C., with the addition of acid-binding agents, preferably sodium carbonate, in a pH range from 2 to 8, preferably 5 to 6.5.

The condensation of the halotriazine with the amines mentioned can take place before or after the condensation of the halotriazine with a dye. The condensation of the halotriazine with one of the amines mentioned is preferably carried out in an aqueous solution or suspension, at low temperatures and a weakly acid to neutral pH. In this case too, the hydrogen halide eliminated in the condensation is advantageously neutralized by the constant addition of aqueous alkaline metal hydroxides, alkaline metal carbonates or alkaline metal bicarbonates.

The diazotization of the diazo components or the intermediates containing a diazotizable amino group is usually carried out by the action of nitrous acid in an aqueous mineral acid solution at low temperatures. The coupling onto the coupling component is carried out at strongly acidic, neutral to weakly alkaline pH values.

In the cases where the radical $R_{12}$ in the likewise preferred reactive dyes of the formulae (16) to (18) or similar compounds is a monochloro- or monofluorotriazine radical containing a non-fibre-reactive substituent, this substituent can be introduced into the triazine ring in a manner known per se by exchanging a halogen atom on the triazine ring for an amino/alkoxy, aryloxy, alkylthio or arylthio radical by a previous or subsequent condensation with an amino, hydroxyl or mercapto compound. Examples of such amino, hydroxyl and mercapto compounds are the following: ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, $\beta$-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, 1-naphthylamine, 2-naphthylamine, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6, -3,7-, -4,7, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzothiazole, 5-, 6- and 8-aminoquinoline, 2-aminopyrimidine, morpholine, piperidine, piperazine, water, methanol, ethanol, propanol, isopropanol, n-butanol, isobutanol, sec-butanol, tert-butanol, hexanol, cyclohexanol, $\beta$-methoxyethanol, $\beta$-ethoxyethanol, $\gamma$-methoxypropanol, $\gamma$-ethoxypropanol, $\beta$-ethoxy-$\beta$-ethoxyethanol, glycolic acid, phenol, o-, m- and p-chlorophenol, methanethiol, ethanethiol, propanethiol, isopropanethiol, n-butanethiol, thioglycolic acid, thiourea, thiophenol, $\alpha$-thionaphthol, $\beta$-thionaphthol.

Furthermore, many compounds which are suitable as diazo components can also be used, in particular those containing a vinyl sulfonyl radical or an equivalent or similar reactive radical, and also the compounds:

N'-$\beta$-($\beta$'-chloroethylsulfonyl)ethyl-3-N-ethylaminobenzamide,

N'-$\beta$-($\beta$'-chloroethylsulfonyl)ethyl-3-N-isopropylaminobenzamide,

N'-$\gamma$-($\beta$'-chloroethylsulfonyl)propyl-3-N-isopropylaminobenzamide,

N'-$\beta$-($\beta$'-chlorethylsulfonyl)ethyl-4-N-ethylaminobenzamide,

N'-$\gamma$-($\beta$'-chloroethylsulfonyl)propyl-4-N-isopropylaminobenzamide.

The condensation of the halotriazines with the amino, hydroxyl or mercapto compounds mentioned is carried out in a manner known per se, preferably in the presence of alkalis.

The reactive dyes of the formula (1) are suitable for the dyeing and printing of a wide range of materials such as silk, leather, wool, polyamidefibres and polyurethanes and in particular of cellulose-containing fibre materials of any kind. Examples of such fibre materials are the natural cellulose fibres such as cotton, linen and hemp, and also cellulose and regenerated cellulose, for example viscose, furthermore modal fibres and mixtures thereof with cotton. The reactive dyes of the formula (1) are also suitable for the dyeing or printing of hydroxyl-containing fibres which are contained in mixed fabrics, for example of mixtures of cotton with polyamide fibres or, in particular, polyester fibres.

The reactive dyes of the formula (1) can also be used in mixtures with one another or in mixtures with other reactive dyes or nonreactive dyes, for example acid dyes or disperse dyes, for the dyeing or printing of the fibre materials mentioned.

The dyes according to the invention can be applied to the fibre material and fixed on the fibre by various methods, in particular in the form of aqueous dye solutions and dye print pastes. They are suitable not only for the exhaust method but also for the dyeing by the pad-dyeing method, according to which the fabrics are impregnated with aqueous, possibly salt-containing dye solutions, and the dyes are fixed by a treatment with alkali or in the presence of alkali, optionally with heating. After fixing, the dyeings or prints are rinsed with cold and hot water, with or without the addition of an agent acting as a dispersant and promoting the diffusion of the nonfixed portions.

Where the reactive dyes of the formula (1), in which D is the radical of an anthraquinone dye, are insufficiently soluble in the alkaline dyeing liquor, this deficiency can be overcome in a manner known from the literature by the addition of dispersants or other non-coloured compounds, for example a naphthalenesulfonic acid/formaldehyde condensate or, in particular, anthraquinone-2-sulfonic acid.

The reactive dyes of the formula (1) are distinguished by a high reactivity, good fixation properties and very good build-up properties. They can therefore be used in the exhaust dyeing method at low dyeing temperatures and require only short steaming times in the pad-steam process. The degrees of fixation are high and the non-fixed portions can be easily washed out, the difference between the degree of exhaustion and degree of fixation being remarkably small, that is, the soap loss is very small. The reactive dyes of the formula (1) are also particularly suitable for prints, in particular on cotton, but just as well also for the printing of nitrogen-containing fibres, for example of wool or silk or of mixed fabrics containing wool or silk.

The dyeings and prints on cellulose fibre materials produced with the dyes according to the invention have a high colour strength and a high fibre-to-dye bond stability, not only in the acidic but also the alkaline range, furthermore good light fastness and very good wet fastness properties such as wash, water, seawater, cross-dyeing fastness and fastness to perspiration, and also good pleating fastness, hot press fastness and crock fastness.

The examples which follow serve to illustrate the invention. The temperatures are given in degrees celsius, parts and percentages are by weight, unless noted otherwise. Parts by weight relate to parts by volume as the kilogram to the liter.

The preparation of the monoazo or disazo intermediates is described in the use examples below not in all cases, but it is clearly evident from the general description.

EXAMPLE 1

A: Synthesis of 2,5-dichloropentylamine hydrochloride from tetrahydrofurfurylamine hydrochloride 1,500 parts of hydrochloric acid (chemically pure) are added to 137.5 parts of tetrahydrofurfurylamine hydrochloride at room temperature. The reaction solution is then heated to 130° C. in a pressure apparatus. This raises the pressure up to 8 bar. After a reaction time of 24 hours, the mixture is cooled to a temperature of 25° C. The dark brown solution is treated with activated carbon and filtered until it is clear, and the mother liquor is concentrated in a rotary evaporator. Recrystallization from 1,200 parts of ethanol gives 130 parts of an analytically pure product, 2,5-dichloropentylamine hydrochloride, having the following formula

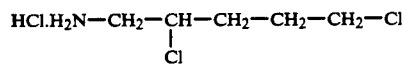

HCl.H$_2$N—CH$_2$—CH—CH$_2$—CH$_2$—CH$_2$—Cl
                    |
                    Cl

| Analysis: formula C$_5$H$_{12}$Cl$_3$N (MW = 192.52) | |
|---|---|
| Calculated | Found |
| 31.20% of C | 30.8% of C |
| 6.29% of H | 6.4% of H |
| 7.28% of N | 6.9% of N |

| Analysis: formula C$_5$H$_{12}$Cl$_3$N (MW = 192.52) | |
|---|---|
| Calculated | Found |
| 55.25% of Cl | 54.85% of Cl |

B: Reaction of 2,5-dichloropentylamine hydrochloride with 2 moles of 2-mercaptoethanol and subsequent oxidation with chlorine to give 2,5-bis(β-chloroethylsulfonyl)pentylamine hydrochloride 25.2 parts of sodium hydroxide pellets are dissolved in 250 parts of ethanol (94%) at room temperature. To this solution are added 32 parts of 2-mercaptoethanol at such a rate that the temperature does not exceed 35° C. The solution is then heated to 70° C., and at this temperature 38.5 parts of 2,5-dichloropentylamine hydrochloride dissolved in 240 parts of ethanol (94%) are added over a period of one hour. The reaction mixture is subsequently refluxed for 3 hours with stirring. Activated carbon is then added, and the mixture is cooled to room temperature. The precipitated salt is then removed by filtration, and the filtrate is concentrated by distillation under reduced pressure. The remaining residue is an oil which decomposes above about 160° C. The compound has the formula

| Analysis: formula C$_9$H$_{21}$NO$_2$S$_2$ (MW = 239.40) | |
|---|---|
| Calculated | Found |
| 45.2% of C | 45.0% of C |
| 8.8% of H | 8.6% of H |
| 5.9% of N | 5.9% of N |
| 26.7% of S | 25.9% of S |

The residue is dissolved in 200 parts of water, and 70 parts of hydrochloric acid (37%) are added at a maximum temperature of 33° C. 60 parts of chlorine gas are then passed over the surface with ice cooling at 15°-20° C. over a period of one hour until no more absorption of chlorine can be observed. The hydrochloric acid is then distilled off under a waterpump vacuum; crude yield: 55 parts.

Recrystallization from methanol in the presence of activated carbon gives the analytically pure product 2,5-bis(β-chloroethylsulfonyl)pentylamine hydrochloride having a melting point 99°-101° C. and the following formula

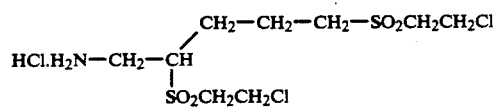

Analysis: formula C$_9$H$_{19}$Cl$_2$NO$_4$S$_2$ × HCl (MW = 376.74)

| Analysis: formula C$_9$H$_{19}$Cl$_2$NO$_4$S$_2$ × HCl (MW = 376.74) | |
|---|---|
| Calculated | Found |
| 28.69% of C | 28.5% of C |
| 5.35% of H | 5.8% of H |
| 3.72% of N | 3.7% of N |
| 17.02% of S | 16.7% of S |
| 28.23% of Cl | 27.95% of Cl |

The 20.1 MHz $^{13}$C spectrum in DMSO has the following form:

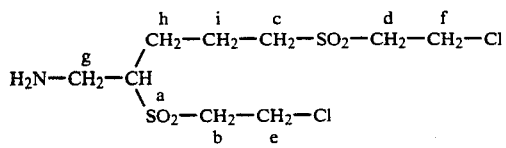

| | |
|---|---|
| a | 58.7278 ppm |
| b, c, d | 56.7526 ppm |
| | 52.2616 ppm |
| | 52.2141 ppm |
| e, f | 36.3773 ppm |
| | 35.9702 ppm |
| g | 36.0882 ppm |
| h | 23.7356 ppm |
| i | 18.3801 ppm |

EXAMPLE 2

A solution of 4 g of sodium hydroxide in 12 ml of water is added to 23.9 g of 2,5-bis($\beta$-hydroxyethylthio)-pentylamine, and a solution of 20.5 g of m-nitrobenzoly chloride in 40 ml of toulene is then added dropwise at 20° to 30° C. over a period of 45 minutes. The reaction mixture is stirred for another 2 hours at 30° to 40° C., and toluene and water are then distilled off in a rotary evaporator, 100 ml of water, 100 ml of ethanol and 20 g of sodium carbonate are then added to the residue, the mixture is stirred for 2 hours at 75° to 80° C., subsequently cooled to 40° C., and water and ethanol are distilled off in vacuo. The oily residue is taken up in 200 ml of ethyl acetate, undissolved material is filtered off, and the solvent is distilled off in vacuo. The product is present as a yellow, very viscous oil. The compound conforms to the formula

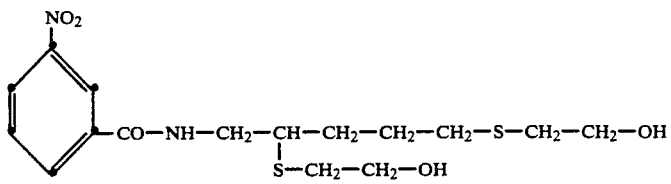

| Analysis: $C_{16}H_{24}N_2O_5S_2$ | |
|---|---|
| Calculated | Found |
| 49.5% of C | 49.0% of C |
| 6.2% of H | 6.3% of H |
| 7.2% of N | 6.9% of N |
| 16.5% of S | 16.8% of S |

The above procedure is repeated, except that instead of m-nitrobenzoyl chloride the para isomer is used to give the corresponding p-nitrobenzamide

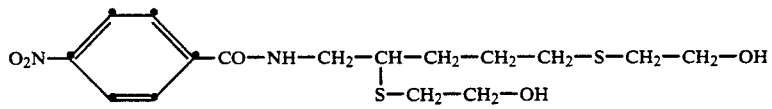

| Analysis: $C_{16}H_{24}N_2O_5S_2$ | |
|---|---|
| Calculated | Found |
| 49.5% of C | 49.4% of C |
| 6.2% of H | 6.5% of H |
| 7.2% of N | 6.8% of N |
| 16.5% of S | 17.1% of S |

To obtain the compounds which conform tot he formulae (31) and (32), the products are reacted further as mentioned above.

The compounds used in different examples as starting materials and designated as product I to V have the following formulae:

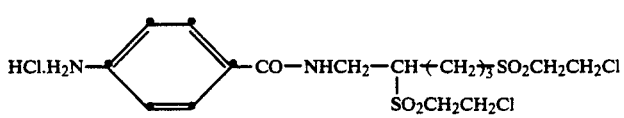

I

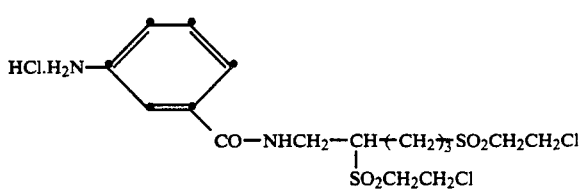

II

-continued

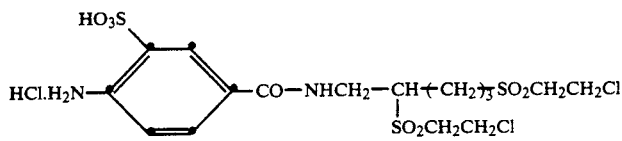
III

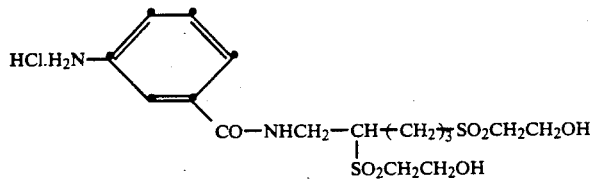
IV

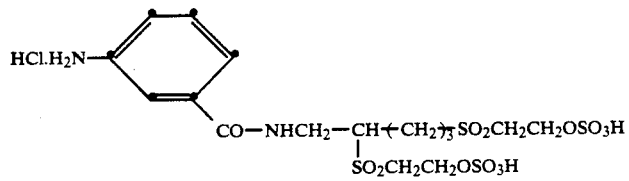
V

EXAMPLE 3

A solution of 43 parts of product I diazotized in hydrochloric acid solution is added at 0° to 5° and a pH of 5 to 6 to a solution of 28.4 parts of 1-(2'-sulfophenyl)-3-carboxy-5-pyrazolone and the coupling reaction is carried out. The yellow monoazo dye is isolated; it conforms to the formula The yellow monoazo dye is vinylated at a pH of 10.0 and room temperature for 30 minutes and subsequently isolated under neutral conditions; it conforms to the formula

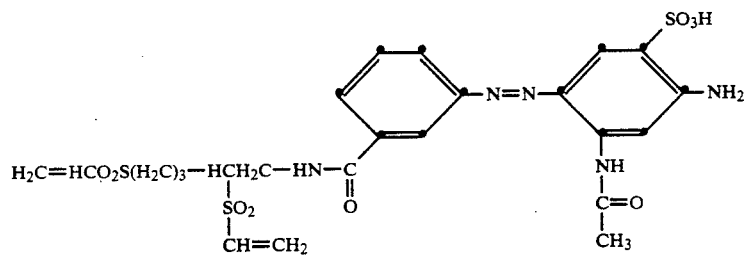

EXAMPLE 5

A solution of 54 parts of product III diazotized in hydrochloric acid solution is added at 0° to 5° and a pH

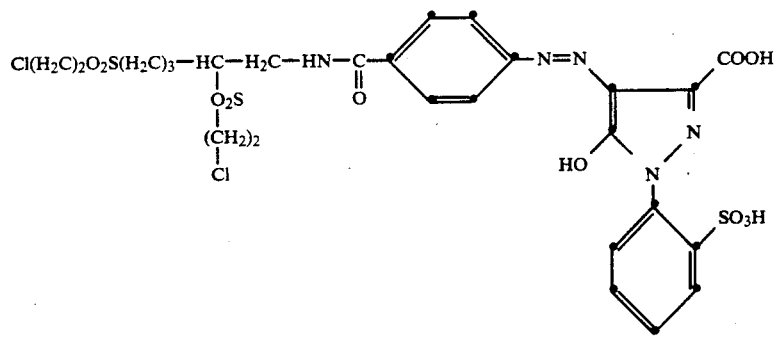

EXAMPLE 4

A solution of 43 parts of product II diazotized in hydrochloric acid solution is added at 0° to 5° and a pH of 4 to 5 to a solution of 23 parts of 3-aminoacetanilide-4-sulfonic acid and the coupling reaction is carried out.

of 5 to 7 to a solution of 29 parts of 1-ethyl-3-aminocarbonyl-4-methyl-5-sulfomethyl-6-hydroxy-2-pyridone and the coupling reaction is carried out. The yellow monoazo dye is isolated after the vinylation; it conforms to the formula

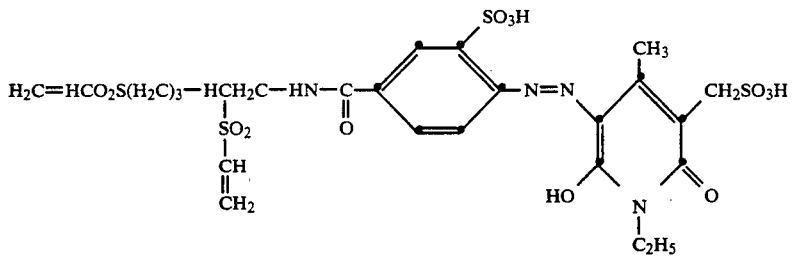

The procedure described to Example 3 is also used to prepare the reactive dyes of the following formulae.

solution, and the coupling reaction is carried out at a pH of 6 to 7. The dye is then vinylated at a pH of 10.0 at No.

6 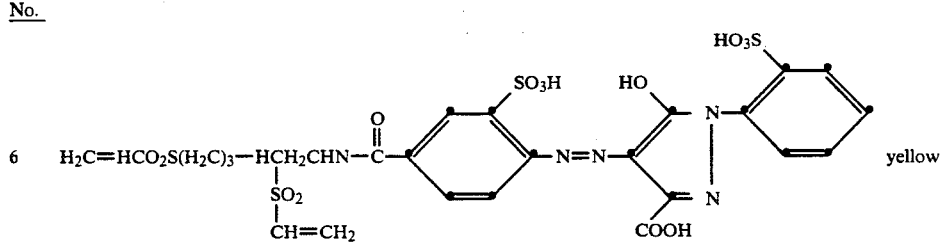 yellow

7 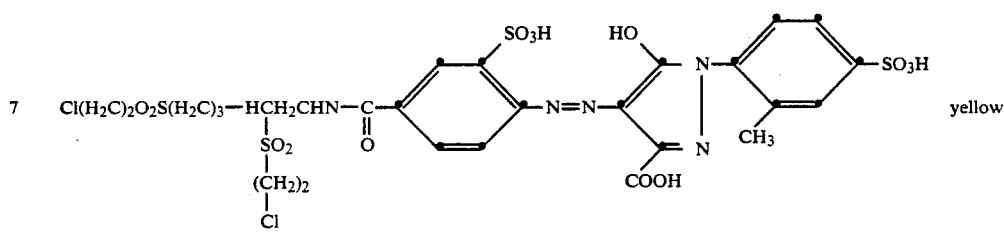 yellow

8 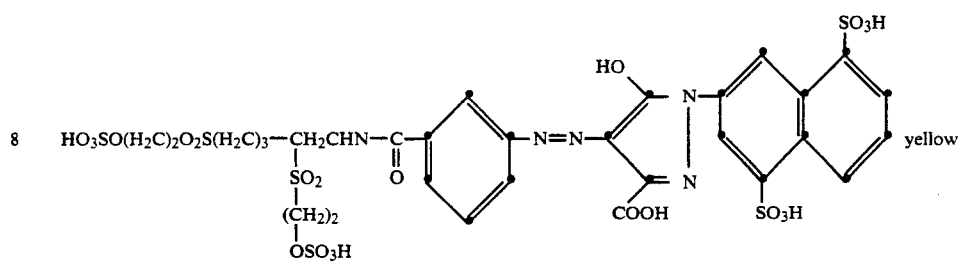 yellow

9 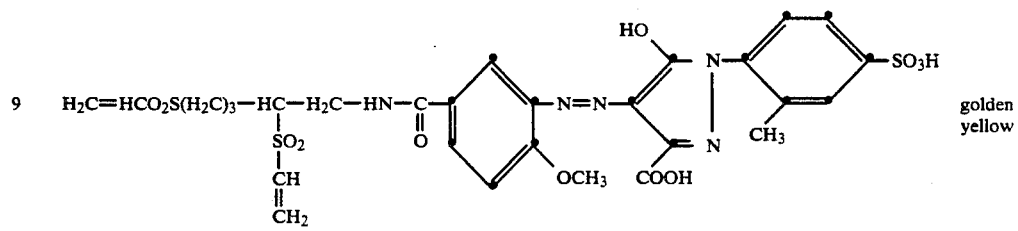 golden yellow

EXAMPLE 10

1,200 parts of a neutral solution of 56.2 parts of 2-acetylamino-5-naphthol-7-sulfonic acid in 400 parts of an ice/water mixture is added dropwise to a solution of 108 parts of product III diazotized in hydrochloric acid solution, and the coupling reaction is carried out at a pH of 6 to 7. The dye is then vinylated at a pH of 10.0 at room temperature and then precipitated under neutral conditions with sodium chloride.

The pressed material is dried by spray-drying. This gives a powder which dyes cotton in pure orange hues and has the following structure

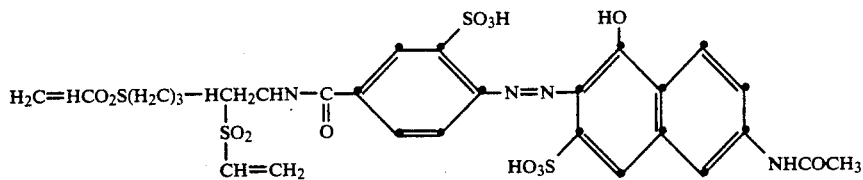
Further dyes which can be prepared by the procedure given in Example 10 are the reactive dyes of the formulae
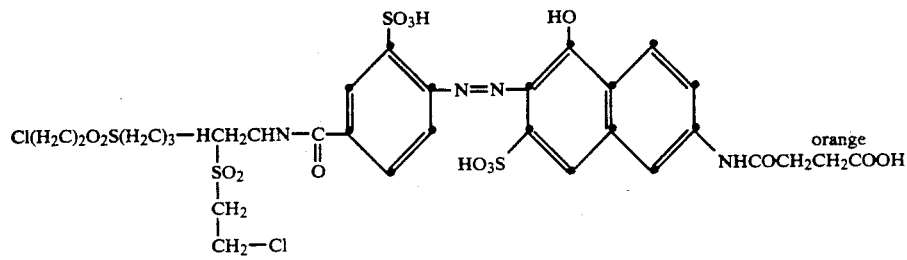
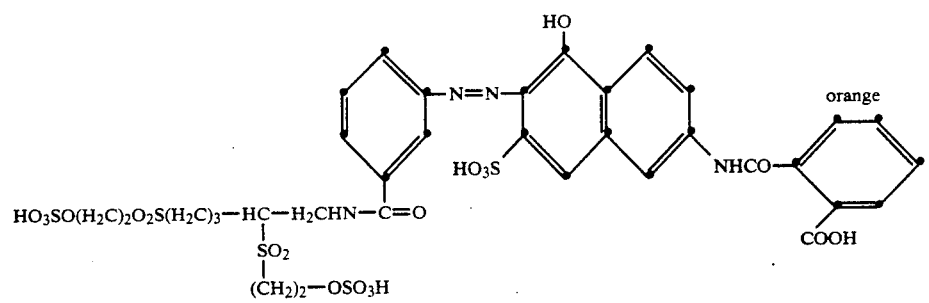
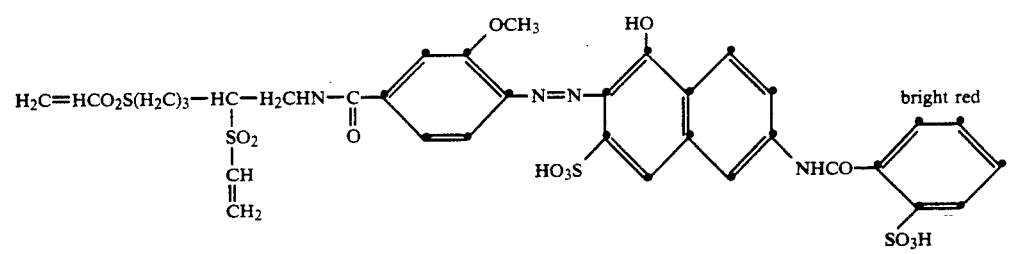
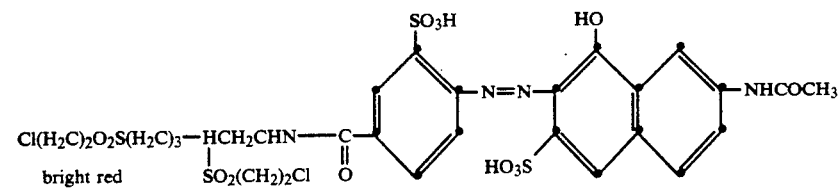
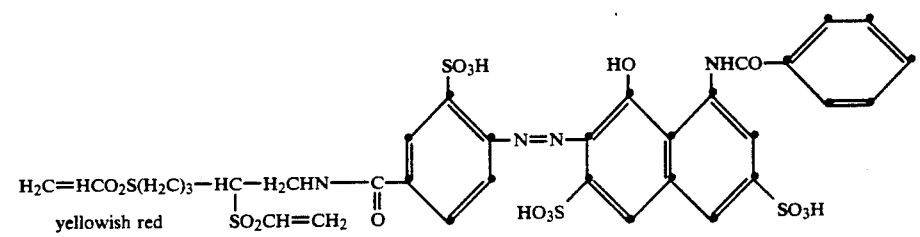

-continued
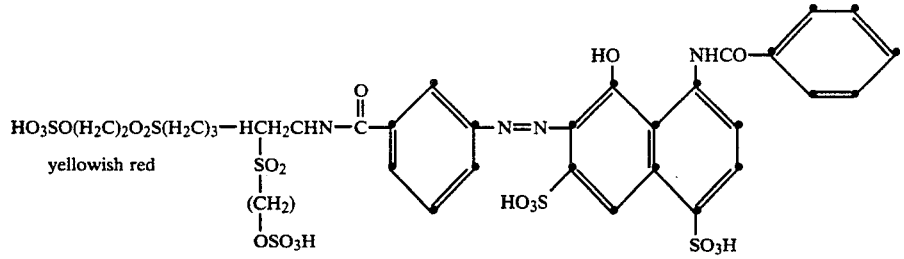
16
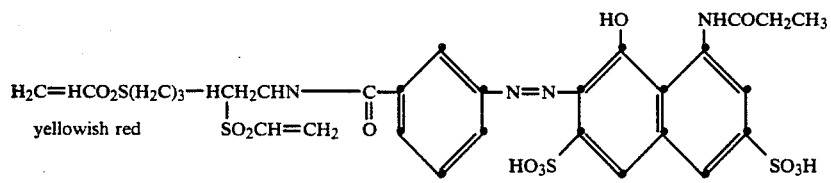
17
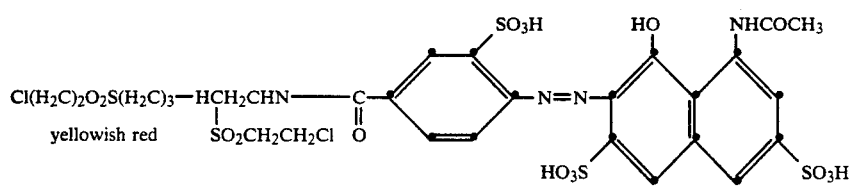
18
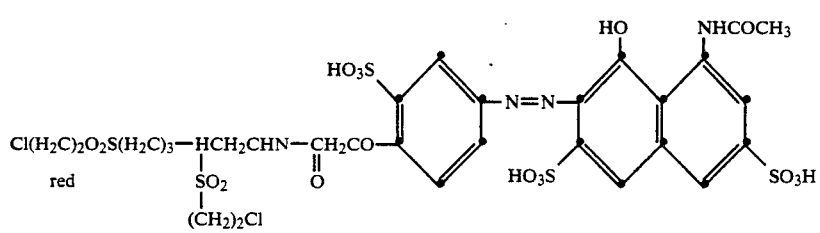
19
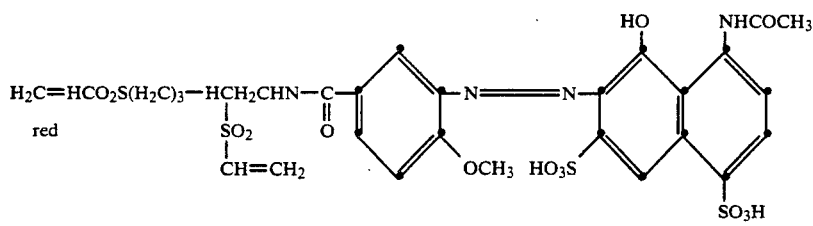
20
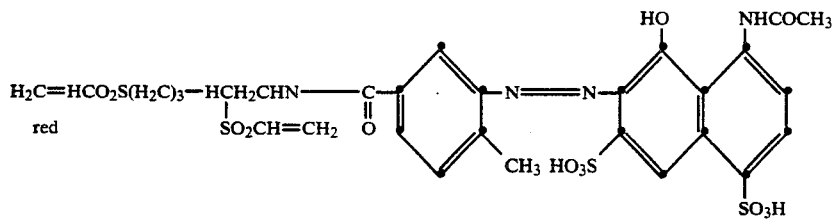
21
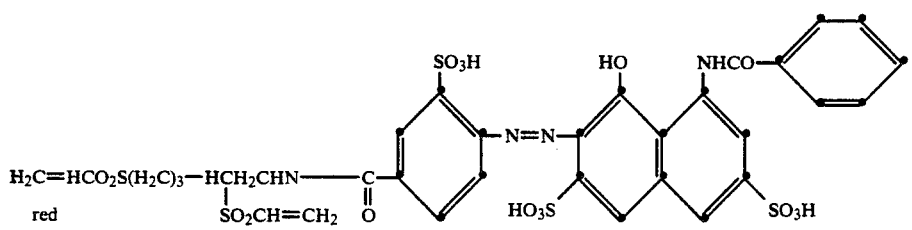
22

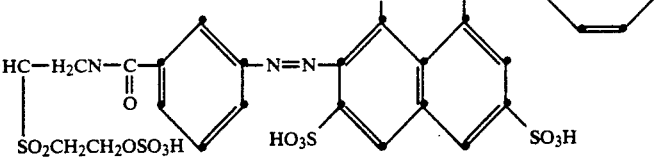

23

EXAMPLE 24

70.25 parts of 4-β-sulfatoethylsulfonylaniline are stirred into 325 parts of water and are dissolved at 20° to 22° C. over a period of one hour at a pH of 5.3 to 6.0 by the addition of sodium bicarbonate. 54 parts by volume of a 31% aqueous hydrochloric acid solution and 225 parts of ice are then added to make it acid to Gongo Red and to maintain it at a temperature from 0° to 5° C. At this temperature, the diazotization is carried out by means of 33.72 parts by volume of a 40% aqueous sodium nitrite solution. A small excess of nitrous acid is subsequently destroyed with 0.5 part of sulfamic acid. 77.8 parts of 1-amino-8-hydroxynaphthalene-3,6-disulfonic acid are then added, and the batch is stirred for 4 to 5 hours at a temperature between 4° to 8° C. and a pH between 1 and 2. After this reaction time, the pH is adjusted to 6.0 with sodium carbonate.

In a separate batch, 135 parts of product III are diazotized analogously to the above procedure. The resulting diazonium suspension is given to the prepared solution of the monoazo compound. The pH is maintained at 6 to 7 and the reaction mixture is stirred for another 3 hours. The diazo compound prepared is isolated by evaporation of the reaction mixture, if necessary, after filtration to obtain a clear solution.

This gives a black, electrolyte-containing powder containing the sodium compound of the formula

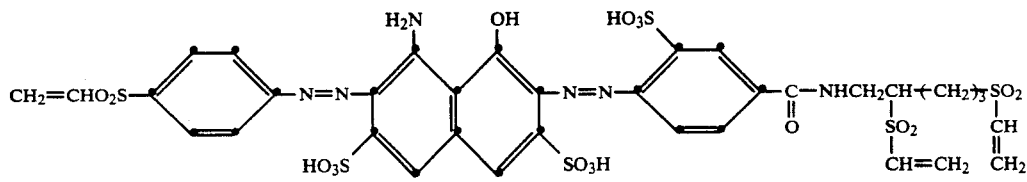

which is highly suitable as a dye for dyeing cellulose fibre materials by the known dyeing and printing methods customary in industry and convention fixing methods for fibre-reactive dyes; navy hues having good fastness properties are produced on these materials.

EXAMPLE 25

The aqueous solution of the dye mentioned in Example 24 is vinylated at room temperature and a pH of 10 for about 30 minutes. The pH is then reduced back to 5.0 with hydrochloric acid and the monoazo dye is spray-dried. It conforms to the formula

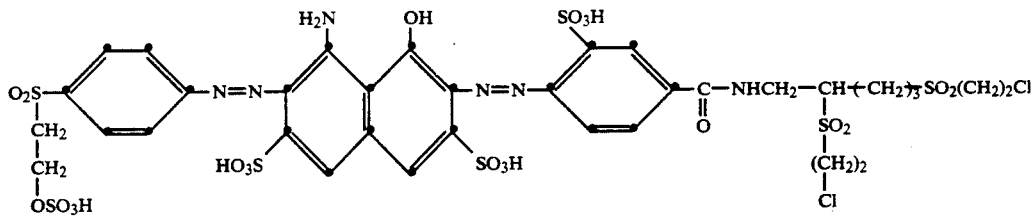

and dyes cotton in navy hues having very good fastness properties.

EXAMPLE 26

44 parts of aniline-p-sulfonic acid are stirred into 200 parts of water and are dissolved at 20° to 22° C. over a period of one hour at a pH of 5.3 to 6.0 by the addition of sodium bicarbonate. 54 parts by volume of a 31% aqueous hydrochloric acid solution and 225 parts of ice are then added to make acid to Congo Red and to maintain it the solution at a temperature from 0° to 5° C. At this temperature, the diazotization is carried out by means of 32.75 parts by volume of a 40% aqueous sodium nitrite solution. A small excess of nitrous acid is subsequently destroyed with 0.5 part of sulfamic acid. 77.8 parts of 1-amino-8-hydroxynaphthalene-3,6-disulfonic acid are then added, and the batch is stirred for 4 to 5 hours at a temperature between 4 and 8° C. and a pH between 1 and 2. After this reaction time, the pH is adjusted to 6.0 with sodium carbonate.

In a separate batch, 135 parts of product III are diazotized analogously to the above procedure. The resulting diazonium suspension is given to the prepared solution of the monoazo compound. The pH is maintained at 6 to 7 and the reaction mixture is stirred for another 3 hours. The diazo compound prepared is isolated by evaporation of the reaction mixture, if necessary, after filtration to obtain a clear solution.

This gives a black, electrolyte-containing powder containing the sodium compound of the formula

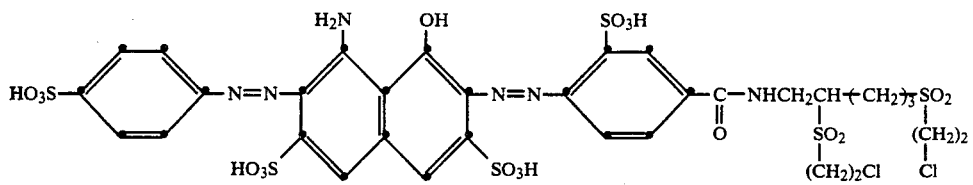

and dyes cotton in navy hues having very good fastness properties.

EXAMPLE 27

A solution of 54 parts of product III diazotized in hydrochloric acid solution is added to 0° to 5° C. and a pH of 5 to 6 to a solution of 29.9 parts of 1-(2'-sulfo-5'-aminophenyl)-3-carboxy-5-pyrazolone and the coupling reaction is carried out. The yellow monoazo dye is then treated with a suspension of 18.8 parts of cyanuric chloride and acylated at a pH of 6.

pH and at room temperature. 173 parts of aniline-m-sulfonic acid are then added as well as about 110 parts of sodium carbonate in portions to maintain the pH at 5.0 to 6.0. This reaction solution is heated to 50° C. and maintained at this temperature for one hour with stirring. The reaction solution is allowed to cool and the azo compound formed is precipitated with sodium chloride, filtered off with suction and dried at 60° C. under reduced pressure. This gives a red electrolyte-containing powder containing the sodium salt of the compound of the formula

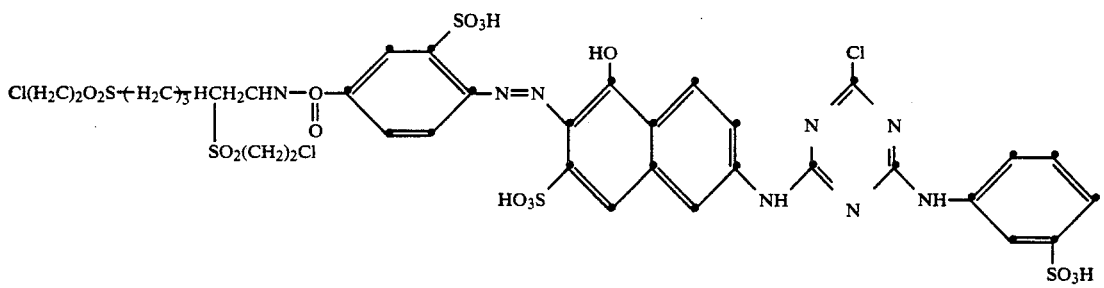

The chlorotriazine dye formed is isolated; it conforms to the formula

This azo compound is highly suitable for use as a dye. As a result of its fibre-reactive properties, it produces,

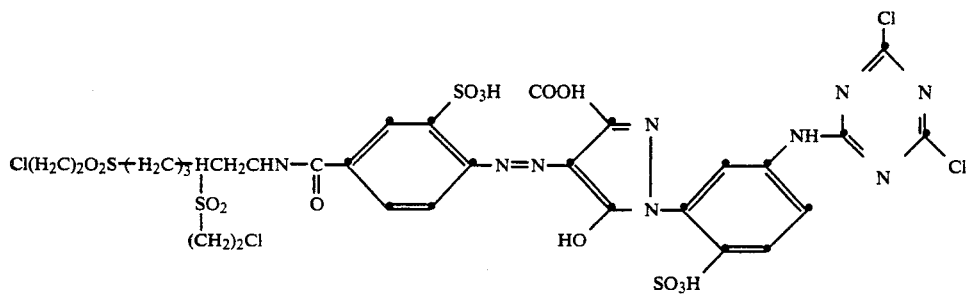

EXAMPLE 28

195 parts of cyanuric are dissolved in 800 parts by volume of acetone; this solution is added to a mixture of 1,300 parts of water and 1,300 parts of crushed ice and 20 parts by volume of a 2N hydrochloric acid solution with vigorous stirring. A solution of a pH of 6.9 to 7.2 and consisting of 239 parts of 2-amino-5-naphthol-7-sulfonic acid, 65 parts of sodium carbonate and 2,000 parts of water are run into the suspension thus obtained over a period of 50 to 60 minutes with stirring. The reaction of cyanuric chloride with the aminonaphthyl is carried out at a temperature between 0° and 5° C. and a pH of 3 to 5. Stirring is continued until no more free amine can be detected by a sample of the diazotizing solution.

540 parts of product III are added to the solution of the coupling component, thus obtained. The mixture is stirred for 2 hours, and its pH is increased to 6.5 to 7.0 during that time by pouring in sodium carbonate in portions. Stirring is continued for another hour at this for example from an aqueous-alkaline liquor by the customary exhaust or pad-dyeing method, deep, orange dyeings on cotton fibres. The dyeings have very good wash and light fastness properties.

EXAMPLE 29

64 parts of 1-amino-8-naphthol-3,6-disulfonic acid are dissolved in 800 parts of water with the addition of 30% sodium hydroxide solution at a pH of 5.0. The solution is then warmed to 30+ C., and 42 parts of 2,4-dichloro-6-isopropoxytriazine are added dropwise, the pH being maintained at 4.0 to 4.5 by the dropwise addition of 2N sodium hydroxide solution. The condensation reaction is carried out at a pH of 4.0 to 4.5 and 65° C. for 15 hours.

The solution is used as the coupling component for the preparation of the dye.

The diazonium compound is prepared by suspending 86 parts of product II in 500 parts of ice water, acidifying the suspension with 45 parts of concentrated aqueous hydrochloric acid and diazotizing it with 40 parts by volume of a 5N sodium nitrite solution. The mixture is stirred for another 2 hours at about 5° C., and excess nitrous acid is then destroyed by means of sulfamic acid. The diazonium salt solution thus prepared is slowly run into the solution of the coupling component at a pH of 5.5 to 6.0. To complete the coupling reaction, the mixture is stirred for another 2 hours. The pH is maintained at 5.5 to 6.0 by the addition of sodium bicarbonate. The dye is then precipitated with sodium chloride, isolated on a nutsch filter and dried in vacuo at 40 C. After the product is ground, a red, electrolyte-containing dye powder is obtained containing the sodium salt of the compound of the formula

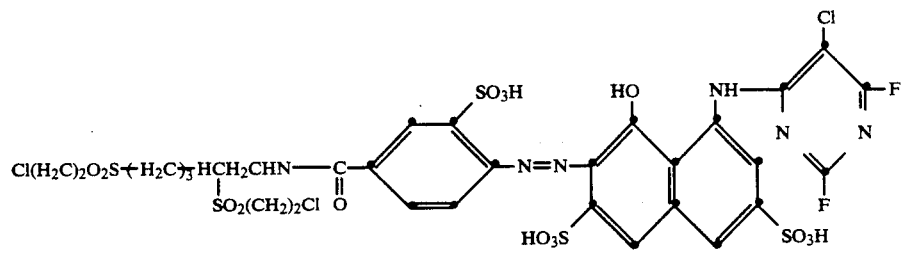

This compound has very good dye properties and dyes cellulose materials by the conventional dyeing and printing processes for reactive dyes in bluish-red hues having very good wet fastness properties.

EXAMPLE 31

64 parts of 1-amino-8-naphthol-3,6-disulfonic acid are dissolved in 800 parts of water with the addition of a 30% sodium hydroxide solution at a pH of 5.0. The solution is then warmed to 60° C., and 45 parts of 2,4,5,6-tetrachloropyrimidine are added dropwise, the pH being maintained at 4.0 to 4.5 by the dropwise addition of 5N sodium hydroxide solution. The condensation reaction is carried out at a pH of 4.0 to 4.5 and 65° C. for 15 hours.

The solution is used as the coupling component for the preparation of the dye.

The diazonium compound is prepared by suspending 108 parts of product III in 500 part of ice water, acidifying the suspension with 45 parts of concentrated aqueous hydrochloric acid and diazotizing it with 40 parts by volume of a 5N sodium nitrite solution. The mixture is stirred for another 2 hours at about 5° C., and excess nitrous acid is then destroyed by means of sulfamic acid. The diazonium salt solution thus prepared is slowly run into the solution of the coupling component at a pH of 5.5 to 6.0. To complete the coupling reaction, the mixture is stirred for another 2 hours. The pH is maintained at 5.5 to 6.0 by the addition of sodium bicarbonate. The dye is then precipitated with sodium chloride, isolated on a nutsch filter and dried in vacuo at 40° C. After the product is ground, a red, electrolyte-containing dye powder is obtained containing the sodium salt of the compound of the formula ture is stirred for another 2 hours. The pH is maintained at 5.5 to 6.0 by the addition of sodium bicarbonate. The dye is then precipitated with sodium chloride, isolated on a nutsch filter and dried in vacuo at 40° C. After the product is ground, a red, electrolyte-containing dye powder is obtained containing the sodium salt of the compound of the formula

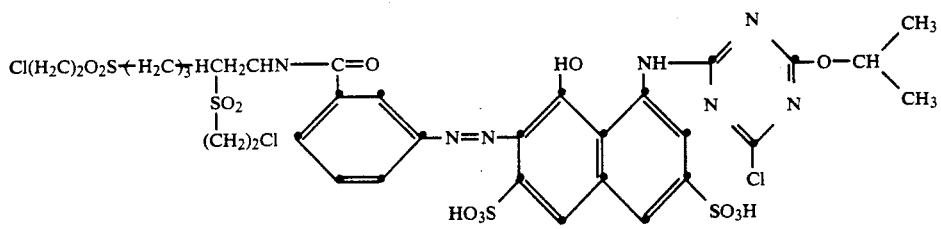

This compound has very good dye properties and dyes cellulose materials by the conventional dyeing and printing processes for reactive dyes in red hues having very good wet fastness properties.

EXAMPLE 30

64 parts of 1-amino-8-naphthol-3,6-disulfonic acid are dissolved in 800 parts of water with the addition of 30% sodium hydroxide solution at a pH of 9.0 to 9.5. The solution is then cooled to 10° C., and 34 parts of 2,4,6-trifluoro-5-chloropyrimidine are added dropwise, during which the pH is maintained at 9.25 to 9.5 by the dropwise addition of 5N sodium hydroxide solution. Stirring is continued at a pH of 8.5 to 9.0 and 15° C. for 15 minutes, and 4N hydrochloric acid solution is then added until the pH reaches 6.5.

The solution is used as the coupling component for the preparation of the dye.

The diazonium compound is prepared by suspending 108 parts of product III in 500 parts of ice water, acidifying the suspension with 45 parts of concentrated aqueous hydrochloric acid and diazotizing it with 40 parts by volume of a 5N sodium nitrite solution. The mixture is stirred for another 2 hours at about 5° C. and excess nitrous acid is then destroyed by means of sulfamic acid. The diazonium salt solution thus prepared is slowly run into the solution of the coupling component at a pH of

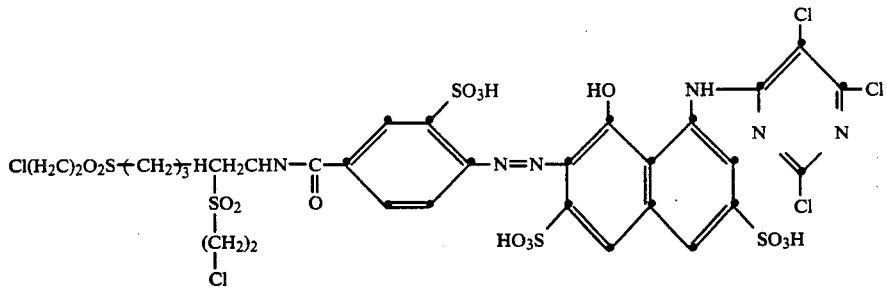

This compound has very good dye properties and dyes cellulose materials by the conventional dyeing and printing processes for reactive dyes in red hues having very good wet fastness properties.

EXAMPLE 32

31.9 parts of 1-amino-8-hydroxynaphthalene-3,6-disulfonic acid are dissolved in 800 ml of water under neutral conditions, and the solution is cooled to 0° to 5° C. At this temperature, 14.2 parts of 2,4,6-trifluoro-1,3,5-triazine are added dropwise over a period of 20 minutes, during which the pH of the reaction solution is maintained weakly acidic to congo red by the addition of 2N sodium hydroxide solution. After adding a mixture of 11 parts of n-methylaniline in 100 ml of water adjusted to a pH of 5, the pH of the reaction mixture is first maintained for a short time weakly acidic to congo red and then at 5 to 6 by the constant addition of 2N sodium hydroxide solution. During that time the temperature is increased to 20° to 25° C. over a period of 2 to 3 hours. After the reaction is completed, this intermediate is coupled at 0° to 10° C. and a pH of 6.5 with 54 parts of the diazotized product III. After the coupling reaction is completed at a pH of 8, the reaction mixture is filtered until the solution is clear, and the resulting reactive dye of the formula

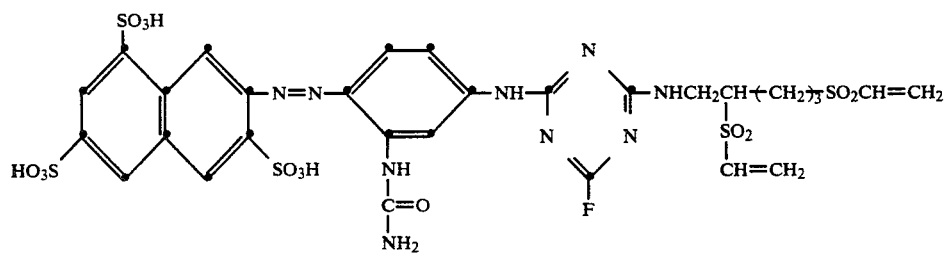

is isolated by evaporation or freeze-drying of the reaction solution at a pH of 7. It dyes cotton in red hues.

EXAMPLE 33

54.5 parts of the dye 2-(4'-amino-2'-ureidophenylazo)-naphthalene-3,6,8-trisulfonic acid are dissolved in 250 parts of water under neutral conditions. The neutral solution is cooled to 0° C. At this temperature, 14.2 parts of 2,4,6-trifluoro-1,3,5-triazine are added dropwise over a period of 20 minutes, during which the pH of the reaction solution is maintained at 6–6.5 by the simultaneous addition of 2N sodium hydroxide solution. After the addition of 38 parts of 2,5-bis($\beta$-chlorethylsulfonyl)-pentylamine hydrochloride in 100 ml of water, the temperature is increased to 20° to 25° C. and the pH maintained at 5.5–6.5. Reaction time about 3 hours. The mixture is then vinylated at a pH of 10.0 for 20 minutes.

The resulting dye of the formula:

is precipitated by the addition of sodium chloride under neutral conditions and dried in vacuo at 40° to 50°.

EXAMPLE 34

54.5 parts of the dye 1-(4'-amino-2'-ureidophenylazo)-naphthalene-3,6,8-trisulfonic acid are dissolved in 250 parts of water under neutral conditions. This neutral solution is added to a suspension of cyanuric chloride in acetone and water which had been prepared according to Example 5. By cooling with ice, the temperature is

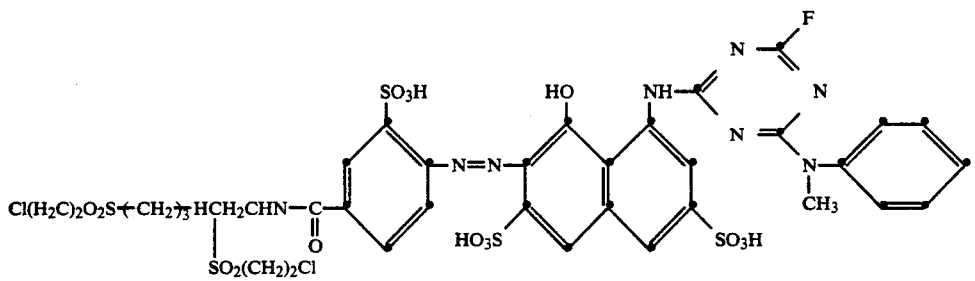

maintained at 0° to 3°. During the acylation reaction, 9 g of bicarbonate are stirred in such a way that the pH remains between 5.5 and 7. As soon as no more starting dye can be detected in the chromatogram, 38 parts of 2,5-bis(β-chloroethylsulfonyl)pentylamine hydrochloride are added in the form of an about 50% paste, and the mixture is heated to 50°. By adding a further 18 g of bicarbonate, the pH is maintained within the limits of 4.5 to 6.0. The reaction is completed as soon as no more alkali is consumed. The resulting dye of the formula:

simultaneous addition of 2N sodium hydroxide solution. After the addition of 38 parts of 2,5-bis(β-chloroethylsulfonyl)pentylamine hydrochloride in 100 ml of water, the temperature is increased to 20° to 25° C. and the pH is maintained at 5.5-6.5. Reaction time about 2 hours. The mixture is then vinylated at a pH of 10.0 at room

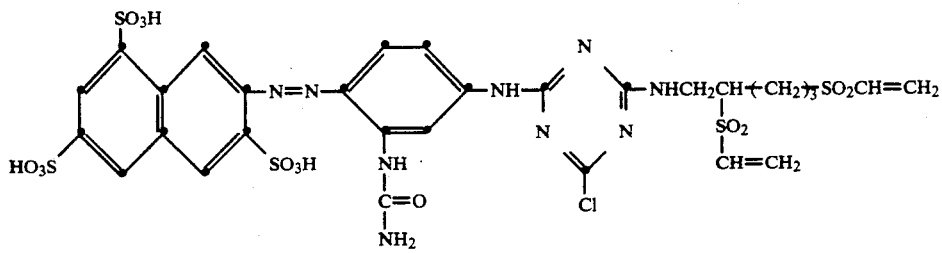

is precipitated after the vinylation by the addition of sodium chloride under neutral conditions and dried in vacuo at 50 to 75°.

EXAMPLE 35

50.3 parts of the dye 2-amino-5-hydroxy-6-(2,5-disulfonylbenzeneazo)naphthalene-7-sulfonic acid are distemperature for 20 minutes, and the pH is brought back to 7.0.

The dye is precipitated by treating the neutral solution with 10% of sodium chloride and 10% of potassium chloride, followed by filtration. The paste obtained is dried in vacuo at 40° to 50°. The reactive dye thus obtained has the following structure:

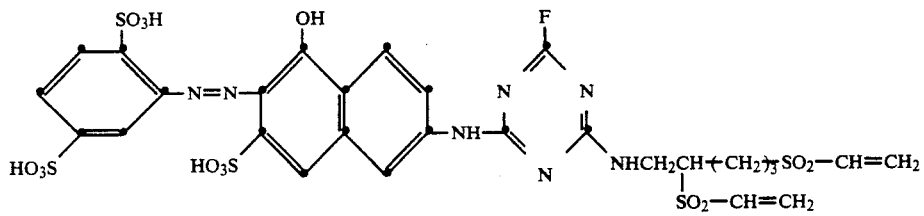

solved in 800 ml of water under neutral conditions, and the solution is cooled to 0° to 5° C. At this temperature, 14.2 parts of 2,4,6-trifluoro-1,3,5-triazine are added dropwise over a period of 20 minutes, during which the pH of the reaction solution is maintained at 6–6.5 by the simultaneous addition of 2N sodium hydroxide solution. After the addition of 43 parts of product II in 100 ml of water, the temperature is increased to 20 to 25° C. and the pH is maintained at 5.5-6.5. Reaction time about 2 hours.

The dye is precipitated by treating the neutral solution with 10% of sodium chloride and 10% of potassium chloride, followed by filtration. The paste obtained is dried in vacuo at 40° to 50°. The reactive dye thus obtained has the following structure.

The starting material 2-amino-5-hydroxy-6-(2', 540-disulfophenylazo)naphthalene-7-sulfonic acid required for the preparation of the dye according to the invention can be obtained as follows:

50.6 parts of 2-aminobenzene-1,4-disulfonic acid are dissolved in 120 parts of water under neutral conditions and diazotized as usual. The diazo compound is then run into a mixture of 56.2 parts of 2-acetamino-5naphthol-7-sulfonic acid which had been dissolved in 300 parts of water under neutral conditions, 25 parts of sodium bicarbonate and 150 parts of ice at 0°-5°. The initial pH is 6.5, increasing to 7.5-7.8 after stirring for some time. After the coupling is completed, 60 parts of 10-normal sodium hydroxide solution are added, and the mixture is heated to 90° for 2 hours to effect hydro-

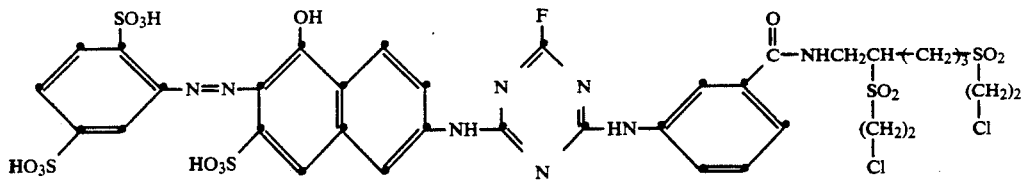

EXAMPLE 36

50.3 parts of the dye 2-amino-5-hydroxy-6-(2,5-disulfonylbenzeneazo)naphthalene-7-sulfonic acid are dissolved in 800 ml of water under neutral conditions, and the solution is cooled to 0°. to 5° C. At this temperature, 14.2 parts of 2,4,6-trifluoro-1,3,5-triazine are added dropwise over a period of 20 minutes, during which the pH of the reaction solution is maintained at 6–6.5 by the lysis of the acetylamino group. The alkaline solution of the orange intermediate dye is made neutral with about 22 parts of 10-normal hydrochloric acid, treated with 20% of sodium chloride and 15% of potassium chloride, stirred for some time and filtered.

EXAMPLE 37

31.9 parts of 1-amino-8-hydroxynaphthalene-3,6-disulfonic acid are dissolved in 800 ml of water under neutral conditions, and the solution is cooled to 0° to 5°. At this temperature, 14.2 parts of 2,4,6-trifluoro-1,3,5-triazine are added dropwise over a period of 20 minutes, during which the pH of the reaction solution is maintained weakly acidic to congo red by the simultaneous addition of 2N sodium hydroxide solution. After adding a mixture of 43 parts of product I in 100 ml of water adjusted to a pH of 5, the pH of the reaction mixture is first maintained for a short time weakly acidic to congo red and then at 5-6 by the constant addition of 2N sodium hydroxide solution. During that time the temperature is increased to 20° to 25° over a period of 2 to 3 hours. After the reaction is completed, this intermediate is coupled at 0° to 10° and a pH of 6.5 with 30.3 parts of diazotized 2-aminonaphthalene-1,5-disulfonic acid. After the coupling reaction is completed at a pH of 8, the reaction mixture is filtered until the solution is clear, and the resulting reactive dye of the formula

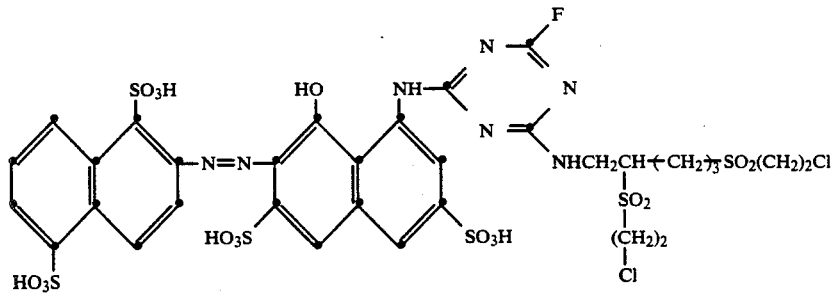

is isolated by evaporation or freeze-drying of the reaction solution at a pH of 7. It dyes cotton in red hues.

EXAMPLE 38

31.9 parts of 1-amino-8-hydroxynaphthalene-3,6-disulfonic acid are dissolved in 800 ml of water under neutral conditions, and the solution is cooled to 0° to 5°. At this temperature, 14.2 parts of 2,4,6-trifluoro-1,3,5-triazine are added dropwise over a period of 20 minutes, during which the pH of the reaction solution is maintained weakly acidic to congo red by the simultaneous addition of 2N sodium hydroxide solution. After adding a mixture of 38 parts of 2,5-bis($\beta$-chloroethylsulfonyl)-pentylamine hydrochloride in 100 ml of water adjusted to a pH of 5, the pH of the reaction mixture is first maintained for a short time weakly acidic to congo red and then at 5-6 by the constant addition of 2N sodium hydroxide solution. During that time the temperature is increased to 20° to 25° over a period of 2 to 3 hours. After the reaction is completed, this intermediate is coupled at 0° to 10° and a pH of 6.5 with 30.3 parts of diazotized 2-aminonaphthalene-1,5-disulfonic acid. After the coupling reaction is completed at a pH of 8, the reaction mixture is filtered until the solution is clear, and the resulting reactive dye of the formula

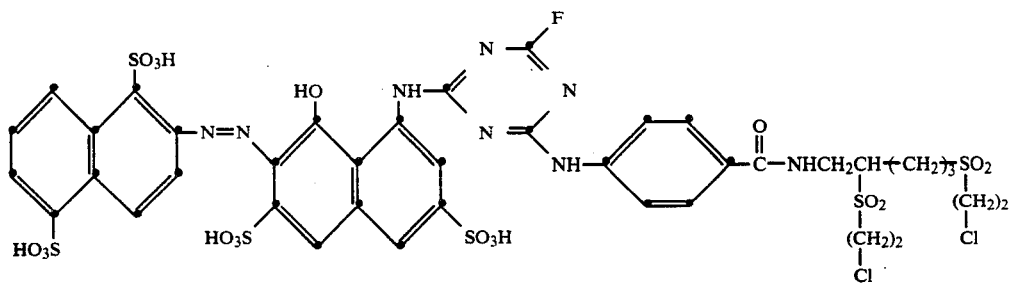

is isolated by evaporation or freeze-drying of the reaction solution at a pH of 7. It dyes cotton in red hues.

EXAMPLE 39

18.5 parts of cyanuric chloride are dissolved in 110 parts of acetone and poured onto 250 parts of ice with vigorous stirring. A solution of 55.3 parts of the dye of the following structure

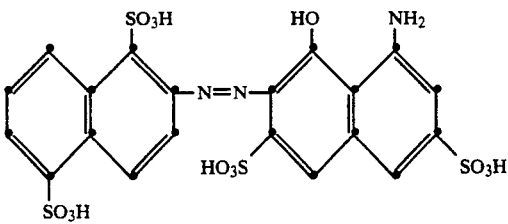

are then rum into the mixture at 0°. 50 parts of 2-normal sodium carbonate solution are then added dropwise to give a pH of 6-6.5. 38 parts of 2,5-bis($\beta$-chloroethylsulfonyl)pentylamine hydrochloride are then added as a powder. The mixture is warmed to 40° C. over a period of ½ hour, and this temperature is maintained for 3 hours. At the same time, 100 parts of 2-normal sodium carbonate solution are added dropwise at a pH of 6.0-6.5. The mixture is then vinylated at a pH of 10.0 for 15 minutes and neutralized. The product is precipitated by the addition of 20% of potassium chloride, followed by cooling to 20°-25° with stirring and filtration. This gives about 235 parts of a dye paste which are dried in vacuo at 50°-55°. The reactive dye prepared has the following structure

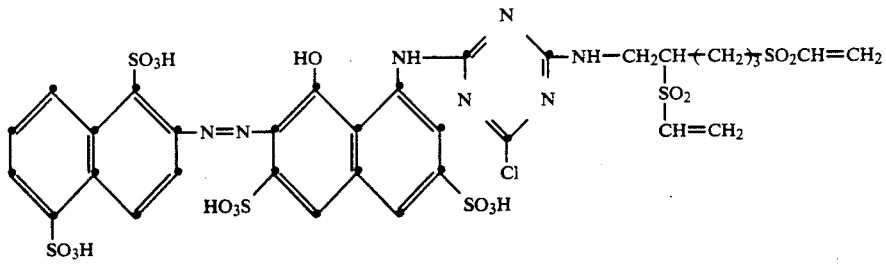

EXAMPLE 40

18.5 parts of cyanuric chloride are dissolved in 110 parts of acetone and poured onto 250 parts of ice with vigorous stirring. A solution of 55.3 parts of the dye of the following structure

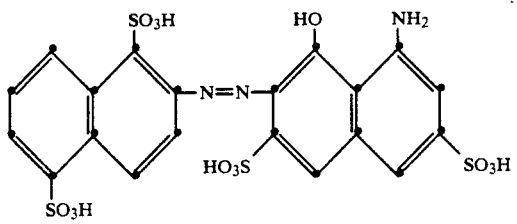

are then run into this mixture at 0°. 50 parts of 2-normal sodium carbonate solution are then added dropwise to give a pH of 6–6.5. 43 parts of product II are then added as a powder. The mixture is warmed to 40° C. over a period of ½ hour, and this temperature is maintained for 3 hours. At the same time, 100 parts of 2-normal sodium carbonate solution are added dropwise at a pH of 4.0–6.0. The product is precipitated by the addition of 20% of potassium chloride solution, followed by cooling to 20°–2520 with stirring and filtration. This gives about 235 parts of a dye paste which are dried in vacuo at 50°–55°. The reactive dye prepared has the following structure another 4 hours at a temperature between 3° and 5° C. and a pH between 1.7 and 2.2 maintained at this value by means of sodium bicarbonate.

b) The diazonium salt of the diazo component is prepared separately: 105 parts by volume of a 40% aqueous sodium nitrite solution are added to a solution of 28.5 parts of 4-β-sulfatoethylsulfonylaniline in 64 parts of water having a pH of 6.7–6.8. This mixture is run into a mixture of 80 parts of crushed ice and 7 parts by volume of a 95% aqueous sulfuric acid solution with thorough stirring. Stirring is continued for another hour at a temperature between 0° C. and 5° C., and excess nitrous acid is decomposed as usual with a small amount of sulfamic acid.

c) The primary condensation product from cyanuric chloride and the aminonaphtholdisulfonic acid, prepared in this example in a), is combined with the diazonium salt solution described in this example in b). The coupling reaction is carried out by adjusting the strongly acidic reaction mixture at a temperature of about 5° C. to a pH of 4.0 to 4.5 by means of sodium bicarbonate and increasing the temperature to 15° to 20° C. Stirring is continued for a few more hours at this pH and this temperature until the coupling is completed.

d) The solution of the monoazo compound of c) is combined with a solution of 38 parts of 2,5-bis(β-chloroethylsulfonyl)pentylamine hydrochloride in 64 parts of water having a pH of 5.5–6.0. The pH is maintained at about 6, and the reaction mixture is heated to

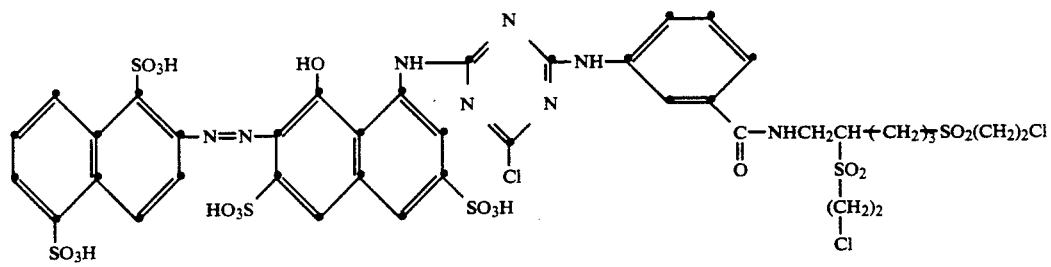

EXAMPLE 41 a) 18.5 parts of cyanuric chloride are stirring into a suspension of 31.9 parts of 1-amino-8-naphthol-3,6-disulfonic acid in 144 parts of water and 72 parts of ice with thorough stirring; the reaction batch is stirred for a temperature of 60° to 65° C. in the course of 2 hours. The pH is then increased to a value between 6.5 and 7.0 by means of sodium bicarbonate, and the filtrate is spray-dried. This gives about 180 parts of a powder of the formula

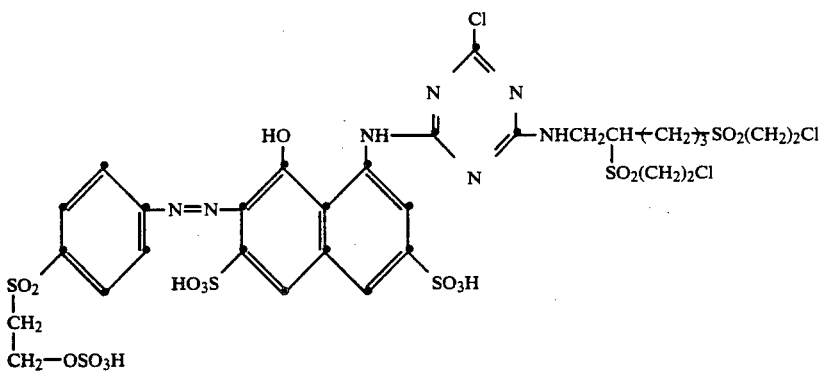

which contains sodium chloride. It dyes cotton in red hues.

EXAMPLE 42

106.6 parts of the dye copper 3-(3'-amino-4'-sulfophenylaminosulfonyl)phthalocyanine-3",3''',3'''-trisulfonic acid are dissolved in water with the addition of the required amount of sodium carbonate under neutral conditions. This solution is run into a suspension of 18.5 parts of cyanuric chloride at 0° to 5° which had been prepared by the dropwise addition of cyanuric chloride dissolved in 110 parts of acetone to 250 parts of ice. During the reaction, the pH is maintained at 6 to 6.5 by the dropwise addition of 50 ml of 2-normal sodium carbonate solution. 48 parts of 2,5-bis($\beta$-chloroethylsulfonyl)pentylamine hydrochloride are added to the resulting intermediate, and the mixture is warmed to 35° to 45° for 4 hours. At the same time, the pH is maintained at 4.0 to 4.5 by the dropwise addition of 100 parts of 2-normal sodium hydroxide solution. The reactive dye prepared has the following structure:

solved in water under neutral conditions. This dye solution is run into a suspension of 18.5 parts of cyanuric chloride at 0°–5°, which had been prepared by dissolving cyanuric chloride in 110 parts of acetone and adding this solution dropwise to 250 parts of ice. During the reaction, the pH is maintained at 4.5–5.5 by the dropwise addition of 50 parts of 2-normal sodium carbonate solution. Stirring at 0°–5° is continued for 1–2 hours until the reaction is completed. 38 parts of 2,5-bis($\beta$-chloroethylsulfonyl)pentylamine hydrochloride are then added, the mixture is heated to about 45° and the pH is maintained at 4.5–5.0 by the addition of 100 parts of 2-normal sodium carbonate solution in portions. The ruby red reactive dye obtained conforms to the following formula:

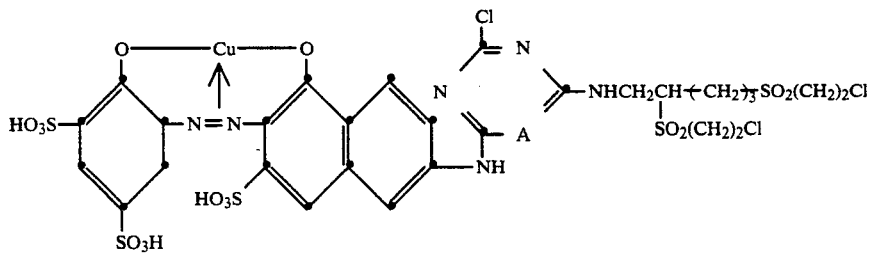

It is precipitated with sodium chloride, filtered off and dried at 55°–60°.

EXAMPLE 44

70.2 parts of the diazo dye 1-amino-2-(4'-sulfophenylazo)-7-(2"-sulfo-5"-aminophenylazo)-8-napthol-

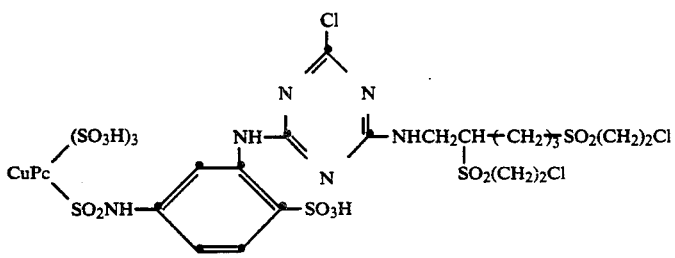

It is precipitated with sodium chloride, filtered off and dried in vacuo at 55°–60°.

EXAMPLE 43

58.1 parts of the copper complex dye prepared by diazotization of 2-aminophenol-4,6-disulfonic acid and coupling onto 2-amino-5-naphthol-7-sulfonic acid, followed by coppering in acetic acid solution, are dis- 3,6disulfonic acid in the form of a neutral solution are reacted at 0°–5° with a suspension of 18.5 parts of cyanuric chloride which had been dissolved in 110 parts of acetone and reprecipitated with 250 parts of ice. The reaction is carried out at a pH of 6.0–6.5 during which the pH is maintained at this value by the dropwise addition of 50 parts of 2-normal sodium carbonate solution. 38 parts of 2,5-bis(β-chloroethylsulfonyl)pentylaminehydrochloride are then added as a powder, the mixture is warmed to 30°–40° and the pH is maintained at 4.0–4.5 during that time by the dropwise addition of 100 parts of 2-normal sodium carbonate solution. The dye obtained has the structure:

EXAMPLE 46

50.3 parts of the dye 1-amino-4-(3'-amino-4'-methyl-5'-sulfophenylamino)anthaquinone-2sulfonic acid are dissolved in water with the addition of the required amount of sodium carbonate under neutral conditions. This solution is added at 0° to 5° to a suspension of 18.5

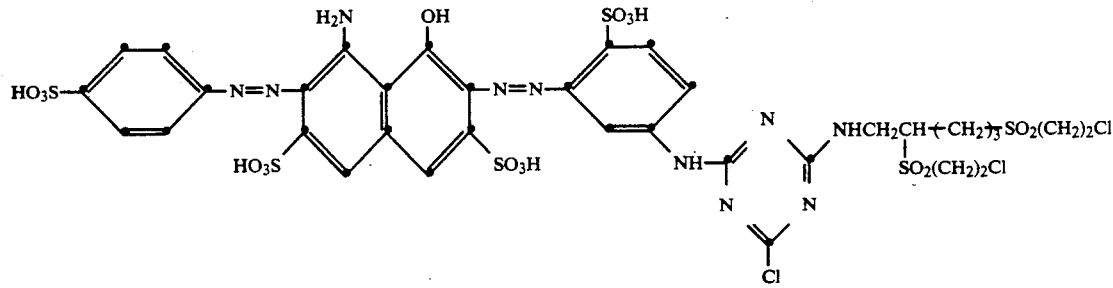

and is isolated by salting out or by spray-drying.

EXAMPLE 45

81 parts of the dizao dye 1-amino-2-(4'-β-sulfatoethylsulfonylphenylazo)-7-(2''-sulfo-5''-aminophenylazo)-8-naphthol-3,6-disulfonic acid in the form of a neutral solution are reacted at 0°–5° with a suspension of 18.5 parts of cyanuric chloride which had been dissolved in 110 parts of acetone and reprecipitated with 250 parts of ice. The reaction is carried out at a pH of 6.0–6.5 during which the pH is maintained at this value by the dropwise addition of 50 parts of 2-normal sodium carbonate solution. 38 parts of 2,5-bis(β-chloroethylsulfonyl)pentylamine hydrochloride are then added as a powder, the mixture is warmed to 30°–40° and the pH is maintained at 4.0–4.5 during that time by the dropwise addition of 100 parts of 2-normal sodium carbonate solution. The dye obtained has the structure:

parts of cyanuric chloride, which had been prepared by the dropwise addition of the solution of cyanuric chloride in 110 parts of acetone to 250 parts of ice. The hydrogen chloride formed in the reaction is neutralized by the dropwise addition of 50 parts of 2-normal sodium carbonate solution, which gives a pH of 6–6.5. 38 parts of 2,5-bis(β-chloroethylsulfonyl)pentylamine hydrochloride are then added, the mixture is warmed to 30°–40° and this temperature is maintained for 3 hours. At the same time, the pH is maintained at 4.0–4.5 by the dropwise addition of 100 parts of 2-normal sodium carbonate solution. The reactive dye obtained of the formula

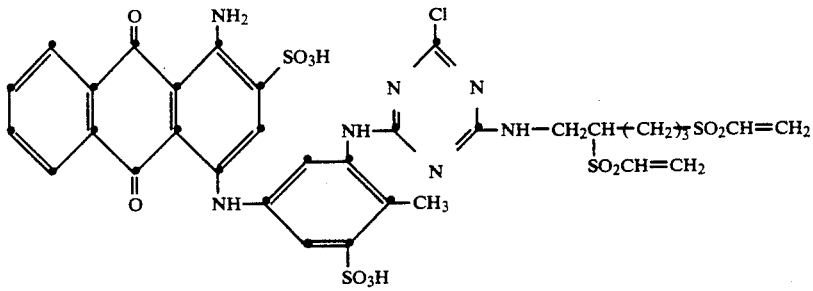

is salted out after the vinylation with sodium chloride under neutral conditions, filtered off and dried at 55°–60°.

EXAMPLE 47

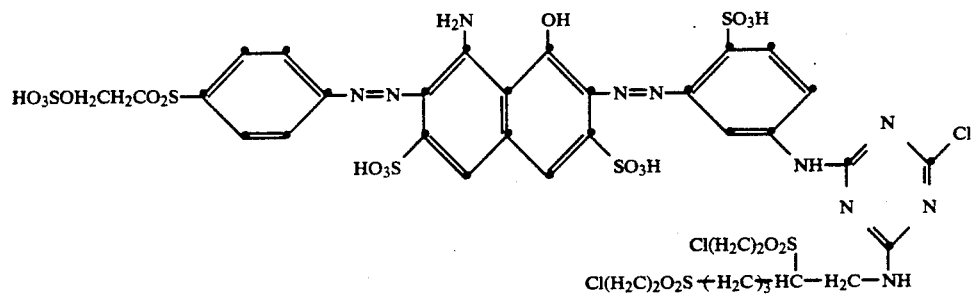

11.5 parts of 1-amino-2-sulfo-4-bromoanthraquinone and 11 parts of product IV are suspended in 120 parts of water. At room temperature, 26 parts of sodium bicarbonate are poured into the solution, giving a pH of 8.5. The suspension is heated to 75°. At 70° to 75° C., a 1:1 mixture of 0.3 part of copper powder/copper(I) chloride are stirred in in 12 portions over a period of 3 hours. After another hour at 75° C., the reaction is completed. The suspension is cooled to room temperature, the product is salted out with 13 g of sodium chloride (about 10% by volume) and filtered off.

To prepare the sulfuric ester, the thoroughly dried dye is stirred into the three-fold amount by weight of sulfuric acid monohydrate, and the mixture is stirred until the dye is completely dissolved. The dye solution is then poured onto ice, which precipitates the ester dye. The dye is filtered off, then stirred in a mixture of ice/water and, after neutralization with potassium carbonate, salted out by pouring in potassium chloride, filtered off and dried.

The reactive dye formed of the formula

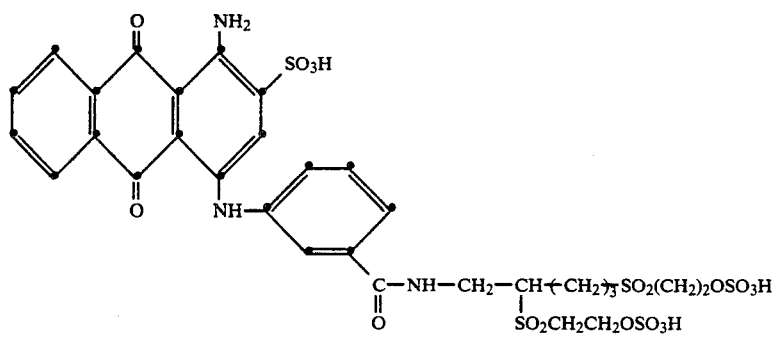

dyes cotton in pure blue hues.

When used according to dyeing procedure IV, this dye becomes virtually insoluble due to the incipient vinylation after the addition of alkali, which results in lower degrees of fixation. However, excellent dyeings resulting in high degrees of fixation are obtained by using the dye as a formulation having the following composition:

6.3 parts of the dye of the abovementioned formula,
2.4 parts of naphthalenesulfonic acid/formaldehyde dispersant and
1.3 parts of anthraquinone-2-sulfonic acid, it also being possible, if desired, to omit the dispersant.

Analogously, all of the following anthraquinone dyes, which are slightly soluble, can be used in the pad-dyeing process.

Following the procedure of Example 47, the following dyes can be synthesized:

No.

48 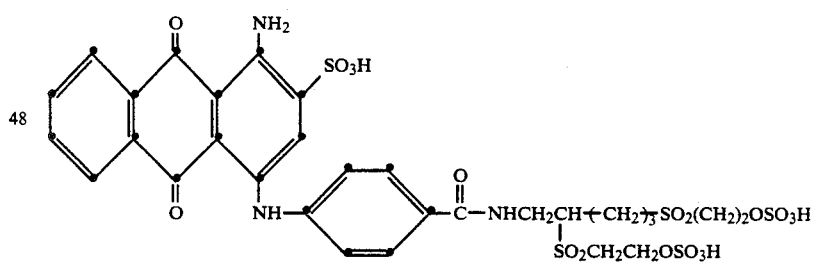

49 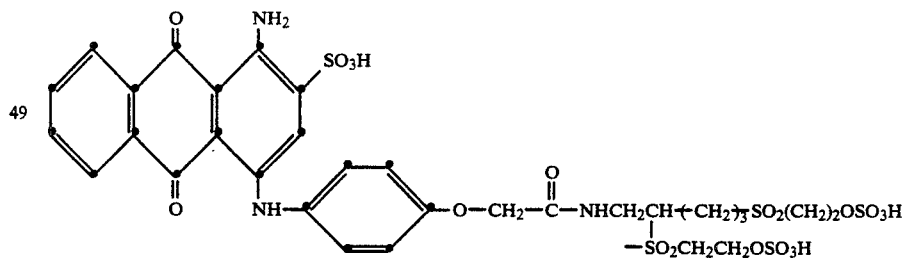

50 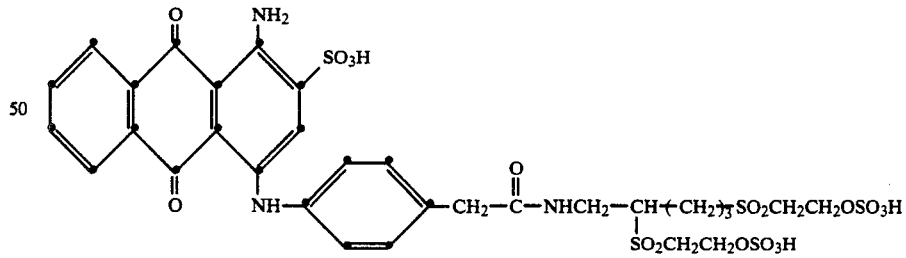

| No. | |
|---|---|
| 51 | 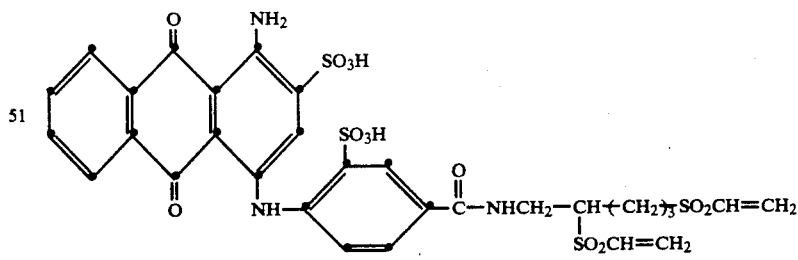 |
| 52 | 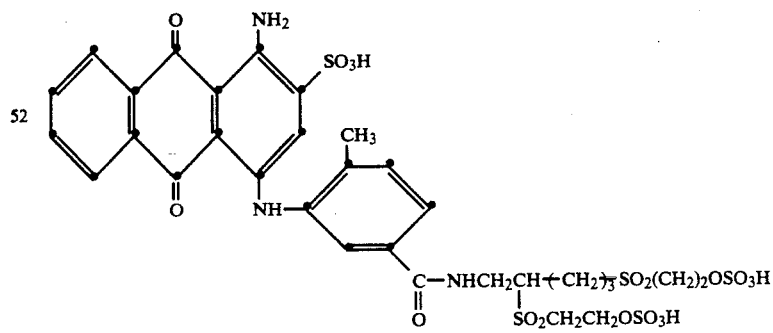 |
| 53 | 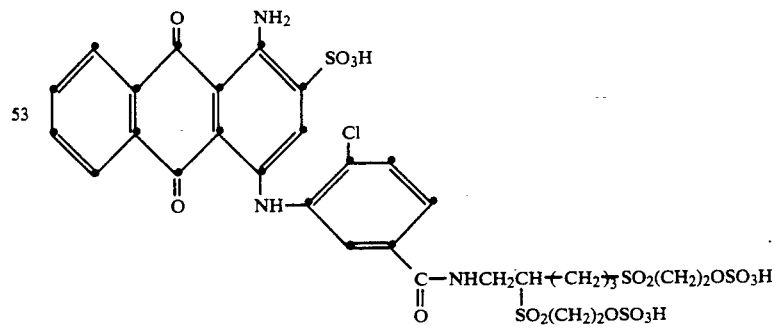 |

EXAMPLE 54

300 parts of chlorosulfonic acid are initially introduced at room temperature. 36 parts of copper phthalocyanine are then stirred in in portions over a period of one hour. The temperature is then slowly increased to 110° C. over a period of two hours. The temperature is increased to 135° C. over a period of one hour. The reaction solution is stirred at 130° to 135° C. for 6½ hours with thorough stirring, subsequently cooled to room temperature and poured onto an ice/water mixture; final volume 2.5 liters. 37 parts (1.5 per cent by volume) of sodium chloride are then added, and the mixture is filtered. The material on the nutsch filter is washed with ice water (1.5% of NaCl) until the washings are neutral to Congo Red.

The 250 parts of paste are suspended in 800 parts of ice water, pH 2.5 to 3.0. A solution of 80 parts of produce V dissolved in 200 parts of water is then added; H of about 2.0. The pH is slowly increased to 5.0 to 5.5 with 20 parts of concentrated ammonia solution, in the course of which the temperature is gradually increased to 25° C.

To complete the reaction, the mixture is stirred at 50° C. for 6 hours, during which the pH is maintained at 5.0 with 2N ammonia solution.

Using 120 parts of sodium chloride solution (5 per cent by volume), the dye of the following formula

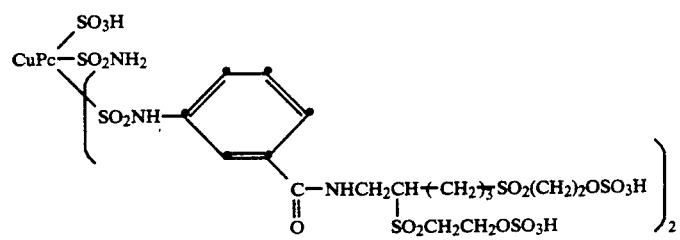

is salted out. It dyes cotton in greenish-blue hues.

Analogously, the following dyes can be synthesized:

No.
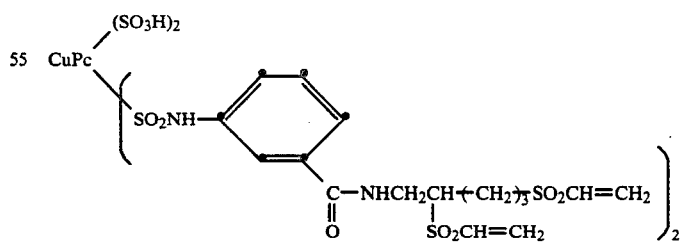
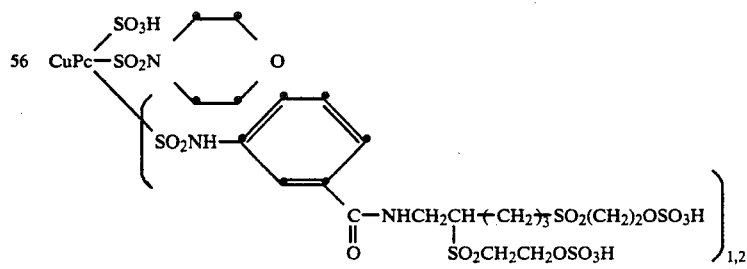
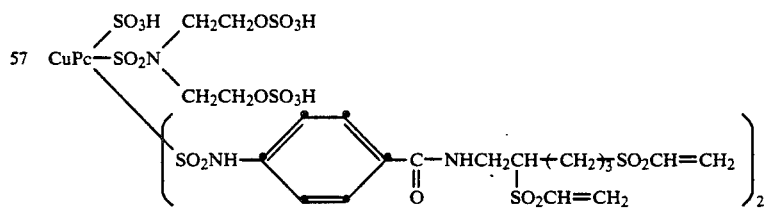
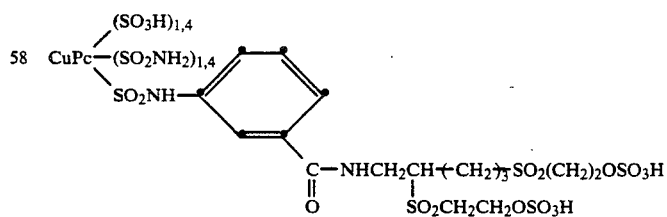
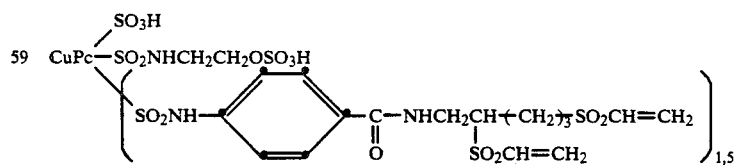
Further dyes which can be prepared using the procedures described in the previous examples are the compounds of the following formulae:
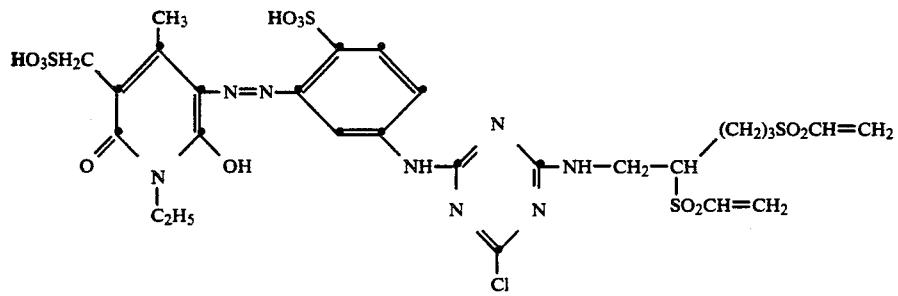
60

61
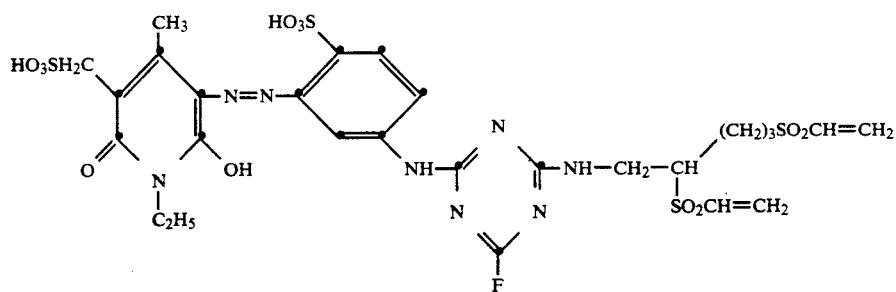
62
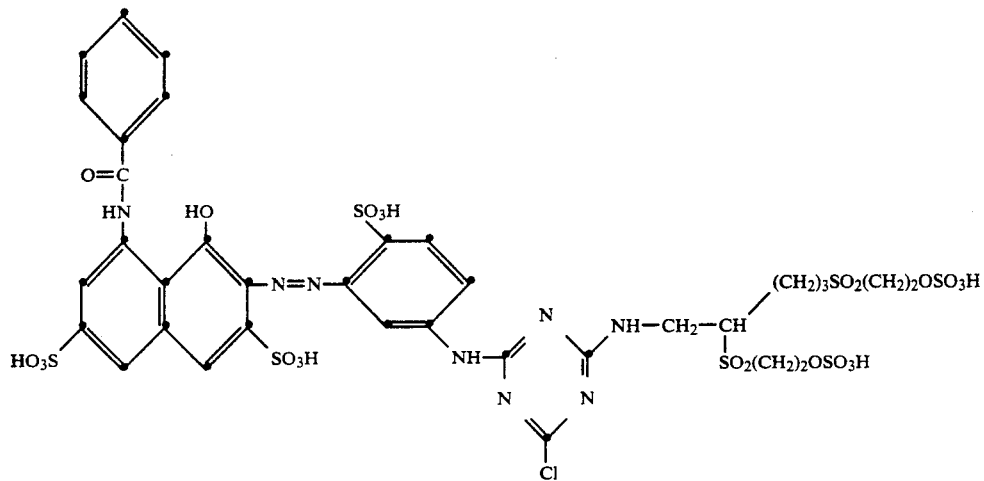
63
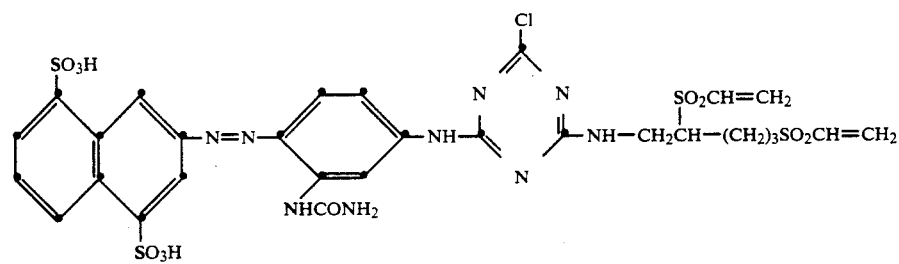
64
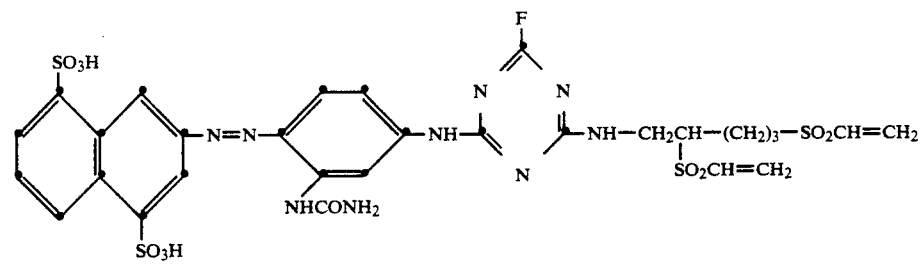
65
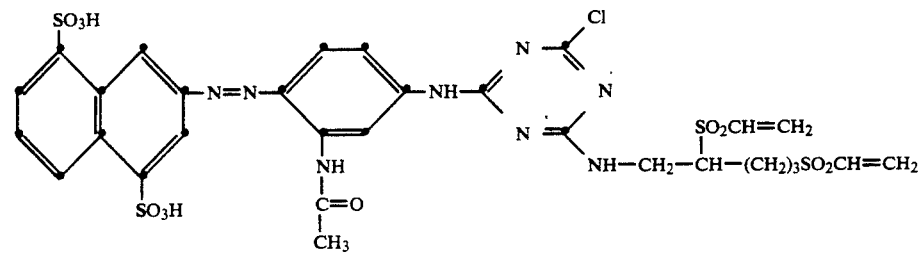

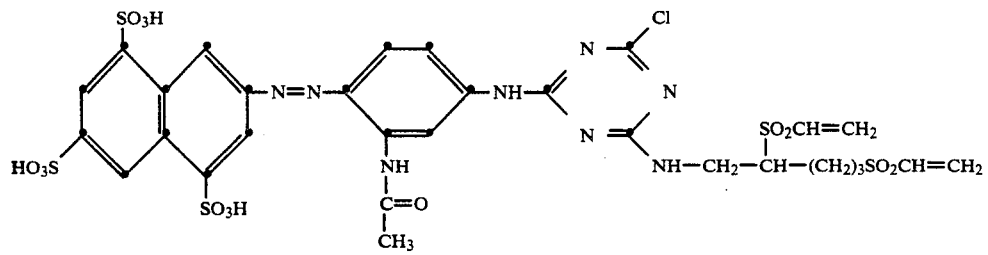
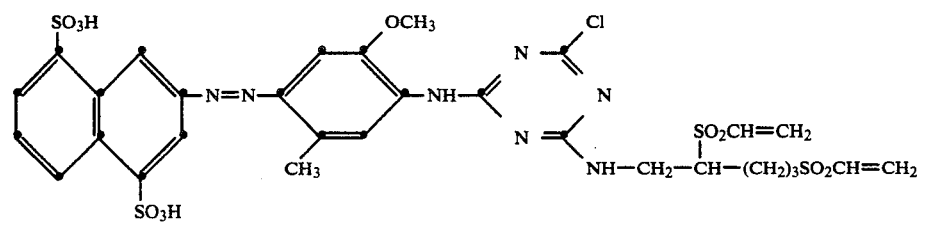
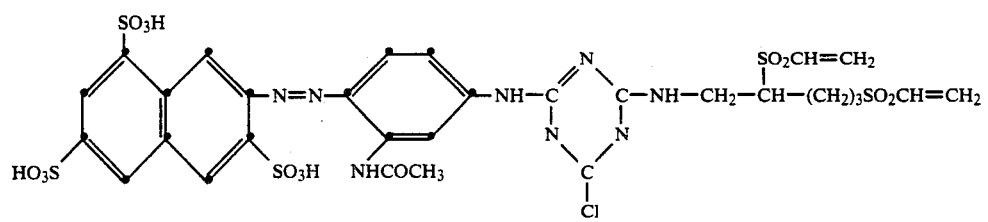
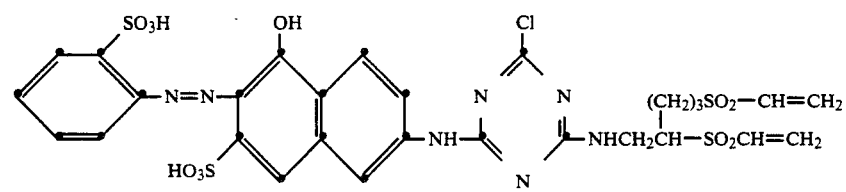
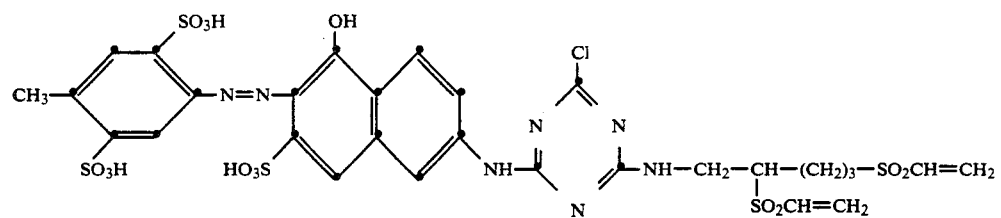
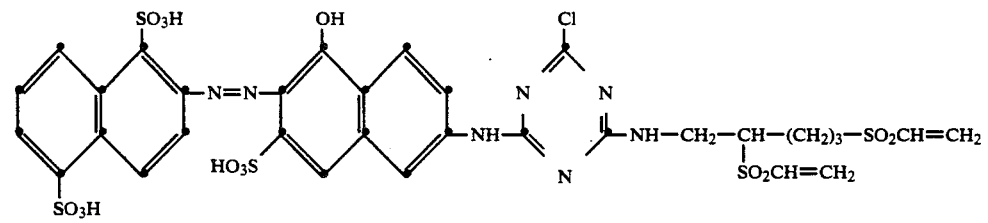
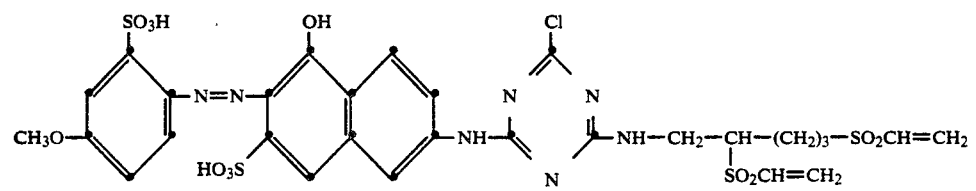

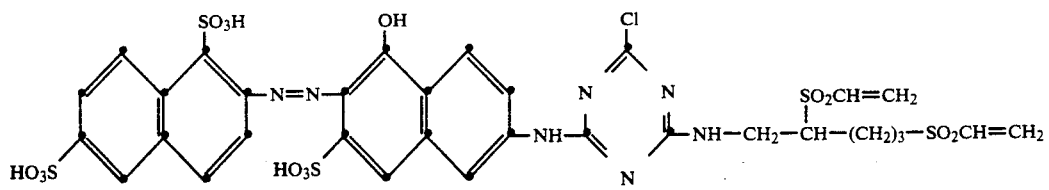
73
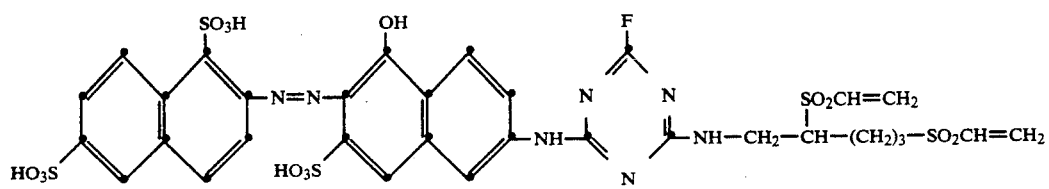
74
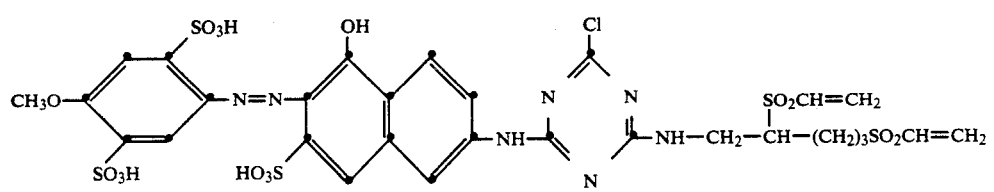
75
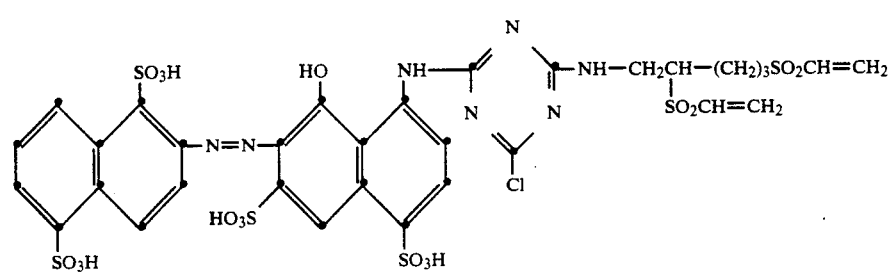
76
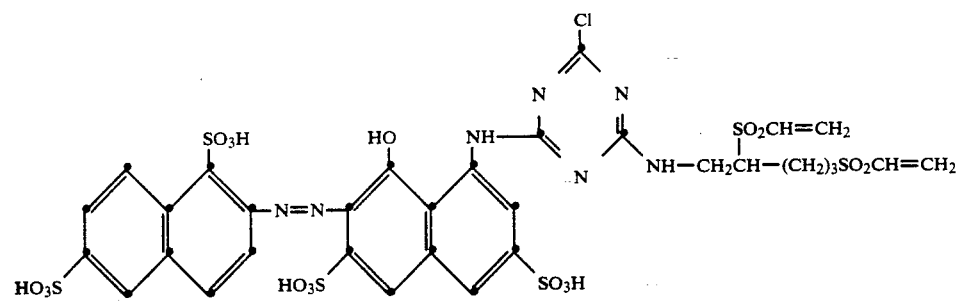
77
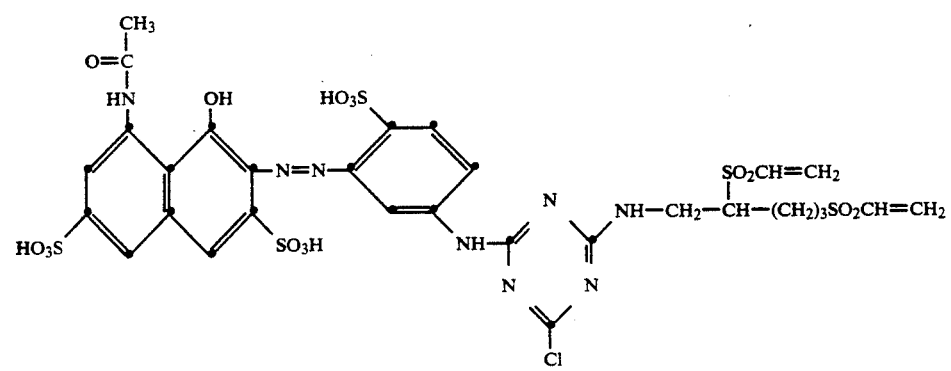
78

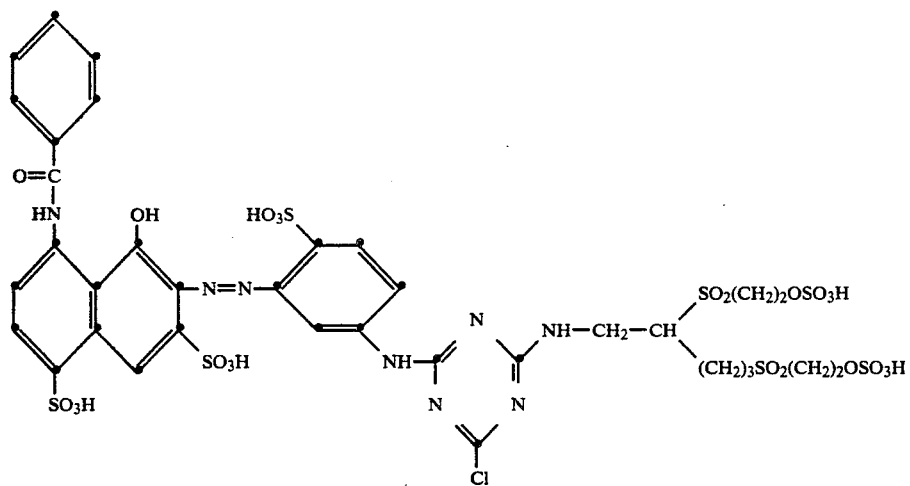
79
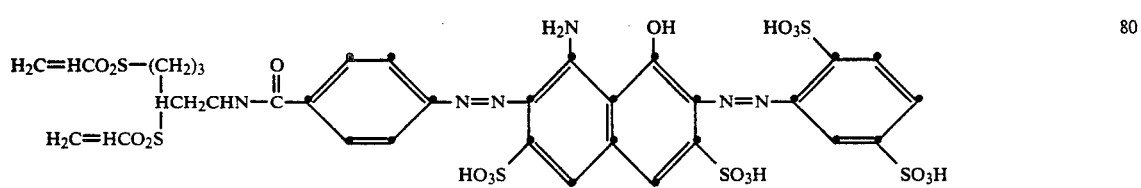
80
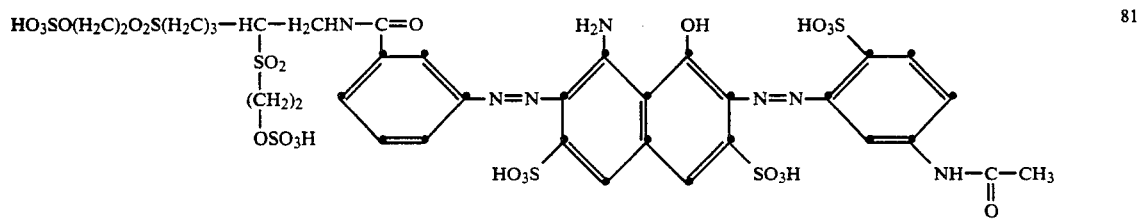
81
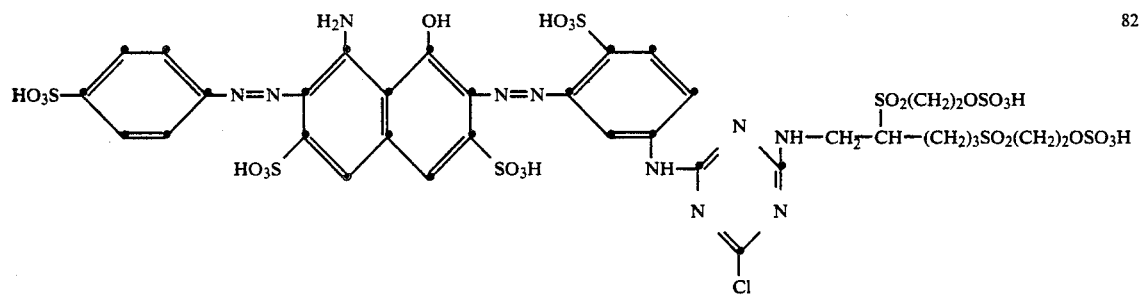
82
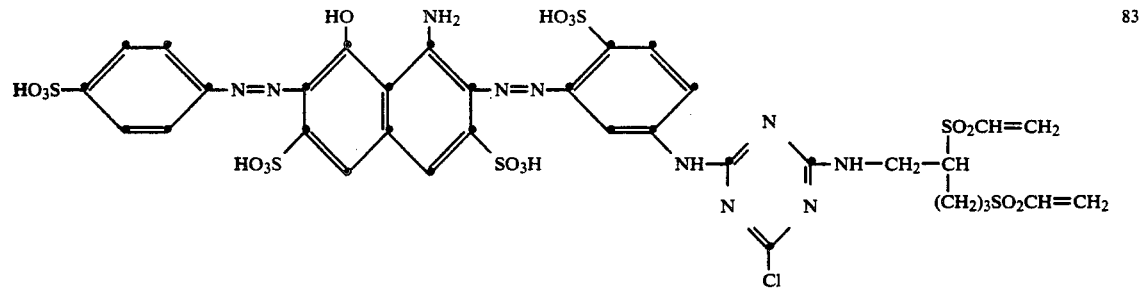
83
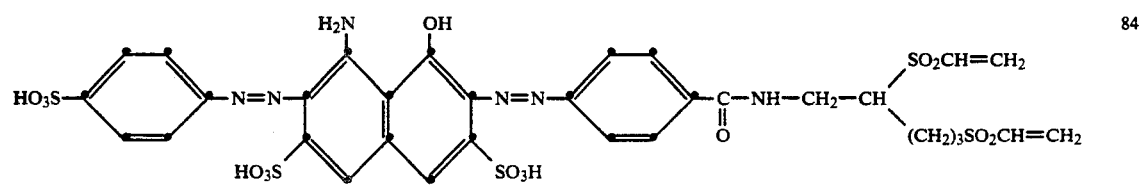
84

-continued
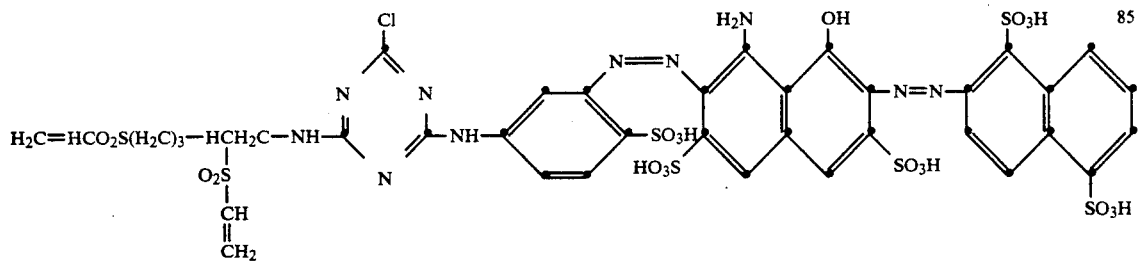
85
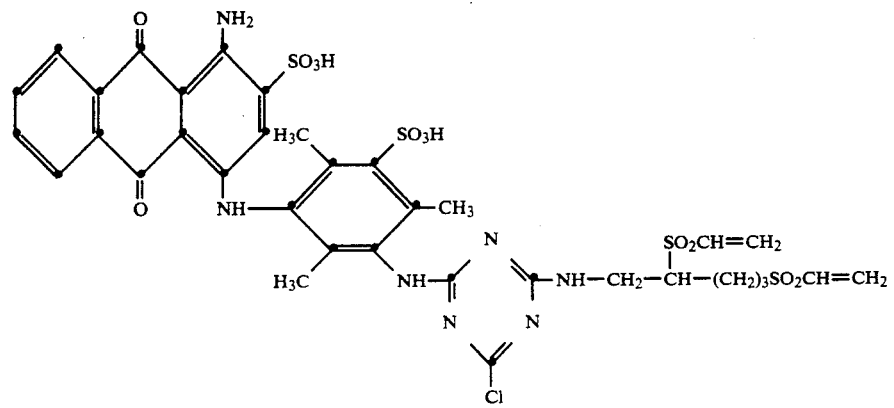
86
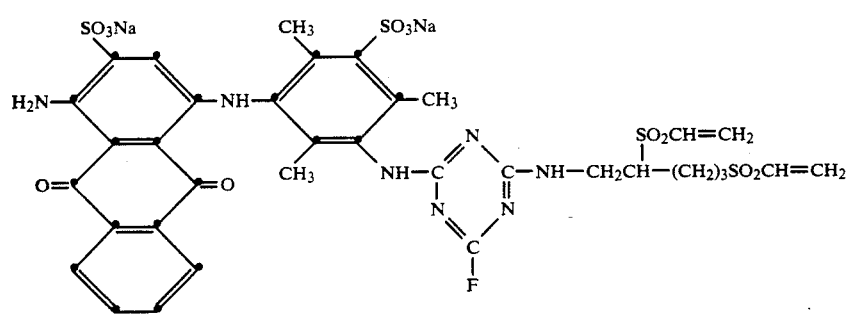
87
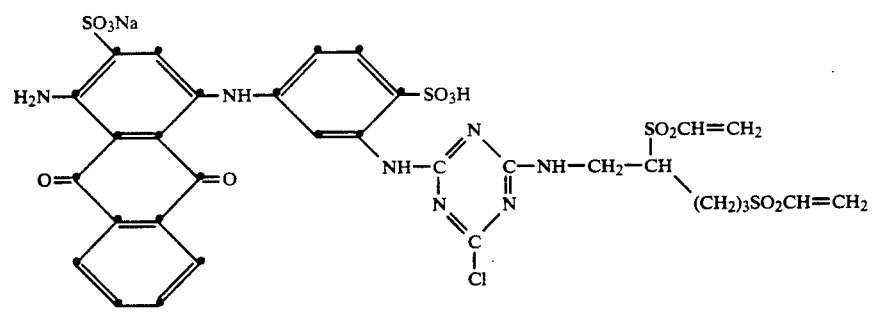
88
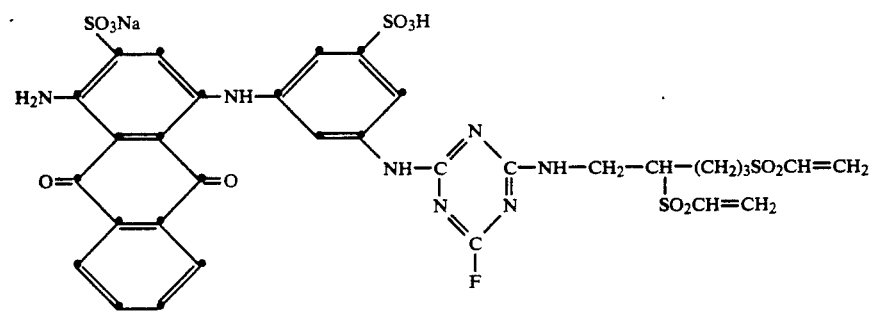
89

-continued
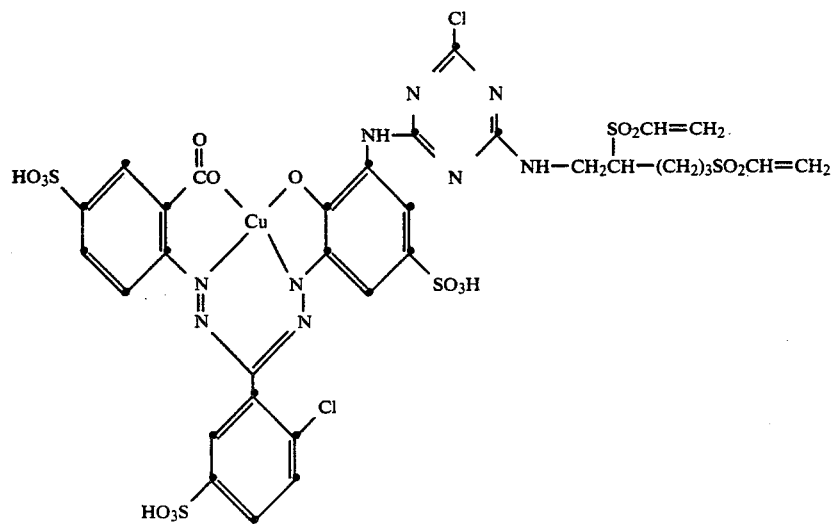
90
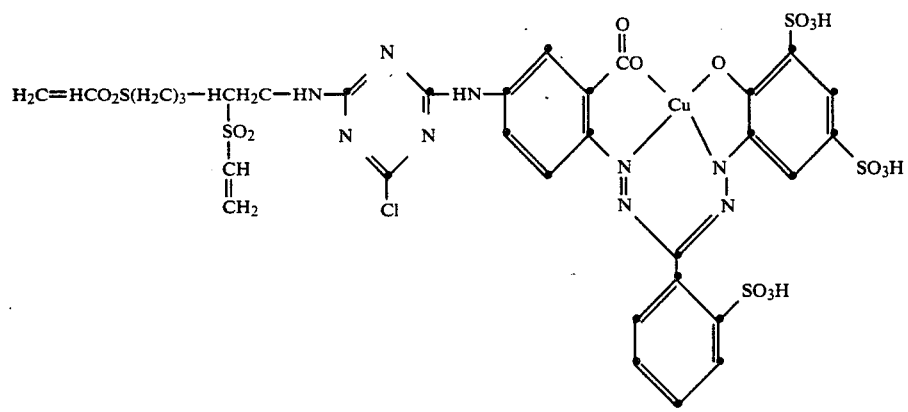
91
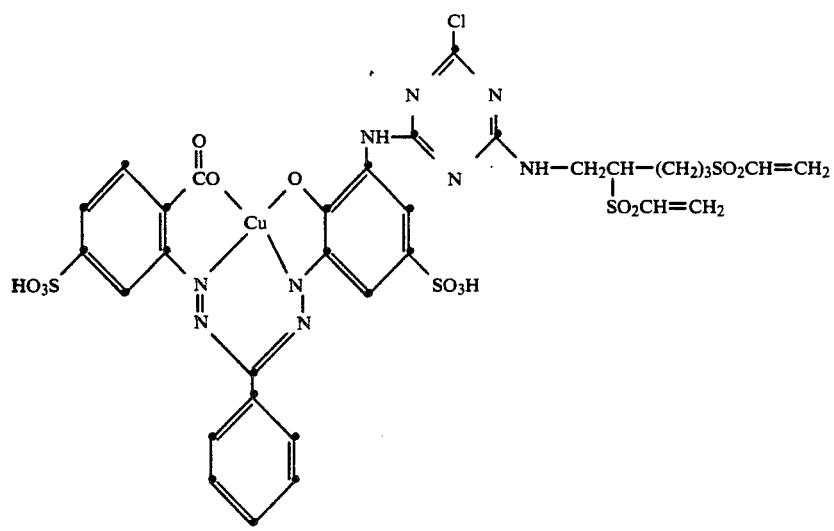
92

-continued

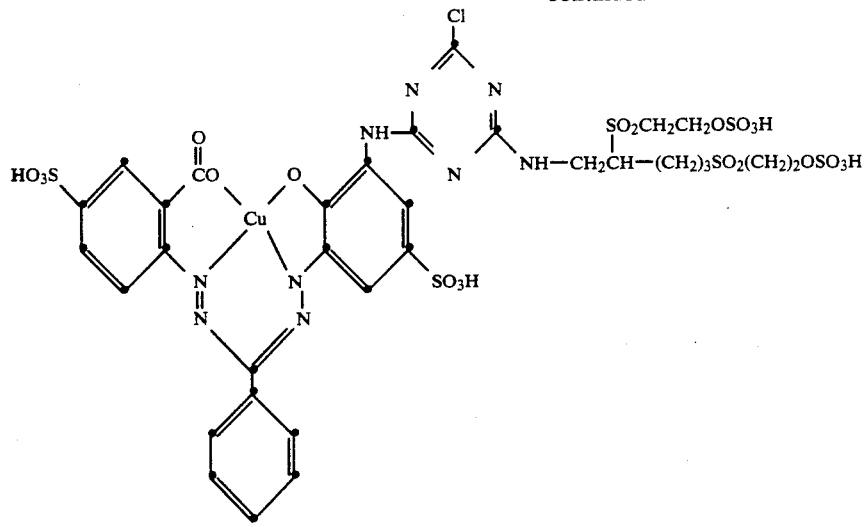
93

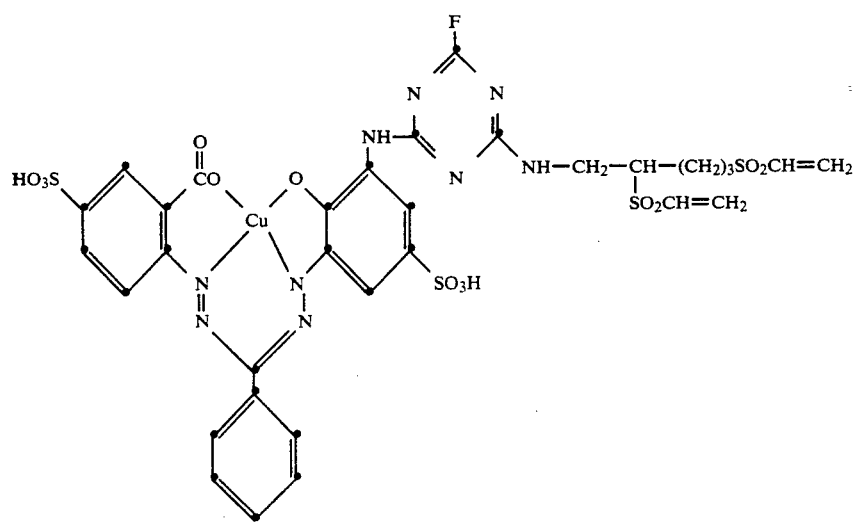
94

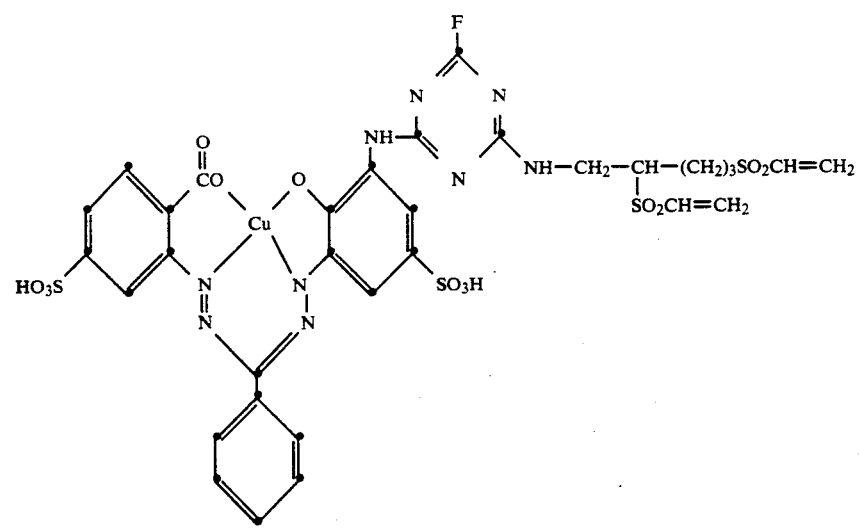
95

DYEING PROCEDURE I 2 parts of the dye obtained according to Example 3 are dissolved in 400 parts of water; 1,500 parts of a solution containing 53 g of sodium chloride per liter are then added. This dyeing bath is entered at 40° C. with 100 parts of a cotton fabric. After 45 minutes, 100 parts of a solution containing 16 g of sodium hydroxide and 20 g of calcined sodium carbonate per liter are added.

The temperature of the dyeing bath is maintained at 40° C. for another 45 minutes. The dyed goods are then rinsed, soaped with a nonionogenic detergent at the boiling temperature for one quarter of an hour, rinsed again and dried.

DYEING PROCEDURE II 2 parts of the reactive dye obtained according to Example 3 are dissolved in 400 parts of water; 1,500 parts of a solution containing 53 g of sodium chloride per liter are then added. This dyeing bath is entered at 35° C. with 100 parts of a cotton fabric. After 20 minutes, 100 parts of a solution containing 16 g of sodium hydroxide and 20 g of calcined sodium carbonate per liter are added. The temperature of the dyeing bath is maintained at 35° C. for another 15 minutes. The temperature is then increased to 60° C. over a period of 20 minutes. The temperature is maintained at 60° C. for another 35 minutes. The dyed goods are then rinsed, soaped with a nonionogenic detergent at the boiling temperature for one quarter of an hour, rinsed again and dried.

DYEING PROCEDURE III 8 parts of the reactive dye obtained according to Example 3 are dissolved in 400 parts of water; 1,400 parts of a solution containing 100 g of sodium sulfate per liter are then added. This dyeing bath is entered at 25° C. with 100 parts of a cotton fabric. After 10 minutes, 200 parts of a solution containing 150 g of trisodium phosphate per liter are added. The temperature of the dyeing bath is then increased to 60° C. over a period of 10 minutes. The temperature is maintained at 60° C. for another 90 minutes. The dyed goods are then rinsed, soaped with a nonionogenic detergent at the boiling temperature for one quarter of an hour, rinsed again and dried.

DYEING PROCEDURE IV 4 parts of the reactive dye obtained according to Example 3 are dissolved in 50 parts of water. 50 parts of a solution containing 5 g of sodium hydroxide and 20 g of calcined sodium carbonate per liter are added. The resulting solution is used to pad a cotton fabric in such a manner that its weight increases by 70%, and the fabric is then wrapped around a batching roller. In this form, the cotton fabric is stored at room temperature for 3 hours. The dyed goods are then rinsed, soaped with a nonionogenic detergent at the boiling temperature for one quarter of an hour, rinsed again and dried.

DYEING PROCEDURE V 6 parts of the reactive dye obtained according to Example 3 are dissolved in 50 parts of water. 50 parts of a solution containing 16 g of sodium hydroxide and 0.04 liter of waterglass (38°Bé) per liter are added. The resulting solution is used to pad a cotton fabric in such a manner that its weight increases by 70%, and the fabric is then wrapped around a batching roller. In this form, the cotton fabric is stored at room temperature for 10 hours. The dyed goods are then rinsed, soaped with a nonionogenic detergent at the boiling temperature for one quarter of an hour, rinsed again and dried.

DYEING PROCEDURE VI 2 parts of the reactive dye obtained according to Example 3 are dissolved in 100 parts of water with the addition of 0.5 part of sodium m-nitrobenzenesulfonate. The resulting solution is used to impregnate a cotton fabric in such a manner that its weight increases by 75%, and the fabric is then dried. The fabric is then impregnated with a warm solution of 20° C. containing 4 g of sodium hydroxide and 300 g of sodium chloride per liter, squeezed down to a weight increase of 75%, the dyeing is steamed at 100° to 102° C. for 30 seconds, rinsed, soaped in a 0.3% boiling solution of a nonionogenic detergent for one quarter of an hour, rinsed and dried.

DYEING PROCEDURE VII 2 parts of the dye of Example 3, 160 parts of sodium sulfate and, as a buffer, 4 parts of $Na_2HPO_4 \times 12H_2O$ and 1 part of $KH_2PO_4$ are added to 2,000 parts of water to give a dyeing bath having a pH of 7. 100 parts of a knitted fabric made of non-mercerized cotton are dipped into this bath. Over a period of 30 minutes, the temperature of the bath is brought to 130° C., and dyeing is carried out at this temperature for 60 minutes. The dyed fabric is then removed from the bath, washed with water, soaped, washed again with water and dried. This gives a yellow dyeing.

DYEING PROCEDURE VIII 2 parts of the dye of Example 29, 2 parts of the known water-insoluble anthraquinone dye of the formula

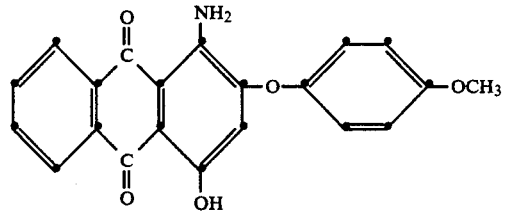

120 parts of sodium sulfate and, as a buffer, 4 parts of $Na_2HPO_4 \times 12H_2O$ and 1 part of $KH_2PO_4$ are added to 2,000 parts of water. 100 parts of a polyester/cotton mixed fabric (50:50) are dipped into the dyeing bath thus obtained, and over a period of 30 minutes the temperature of the bath is brought to 130° C., at which temperature dyeing is carried out for 60 minutes. The dyed fabric is then removed from the bath, washed with water, soaped, washed again with water and dried. This gives a red fabric dyed level. The dyeing bath is maintained at a pH of 7 before and during the dyeing.

PRINTING PROCEDURE I 3 parts of the reactive dye obtained according to Example 3 are quickly stirred into 100 parts of a standard thickener containing 50 parts of a 5% sodium alginate thickener, 27.8 parts of water, 20 parts of urea, 1 part of sodium m-nitrobenzenesulfonate and 1.2 parts of sodium bicarbonate. The printing paste thus obtained is used to print a cotton fabric, after which the printed material obtained is dried and steamed at 102° C. in saturated steam for 2 minutes. The printed fabric is then rinsed, if necessary soaped at the boiling temperature and rinsed again, and subsequently dried.

PRINTING PROCEDURE II 5 parts of the reactive dye obtained according to Example 3 are quickly stirred into 100 parts of a standard thickener containing 50 parts of a 5% sodium alginate thickener, 36.5 parts of water, 10 parts of urea, 1 part of sodium m-nitrobenzenesulfonate and 2.5 parts of sodium bicarbonate. The printing paste, the stability of which conforms to the technical requirements, thus obtained is used to print a cotton fabric, after which the printed material obtained is dried and steamed at 102° C. in saturated steam for 8 minutes. The printed fabric is then rinsed, if necessary soaped at the boiling temperature and rinsed again, and subsequently dried.

What is claimed is:

1. A compound of the formula

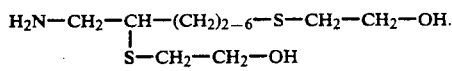

2. A compound according to claim 1 of the formula

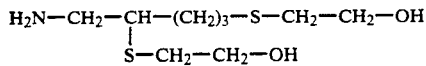

3. A compound of the formula

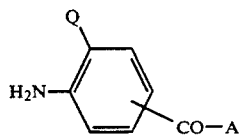

or a compound of the formula

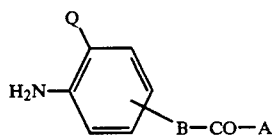

in which B is a —(CH$_2$)$_n$— or —O—(CH$_2$)$_n$— radical, where n is 1 to 6; Q is selected from the group consisting of hydrogen, C$_1$–C$_4$alkyl, C$_1$–C$_4$alkoxy, halogen, carboxyl and sulfo; and A is an amino substituent of the formula

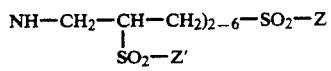

and Z and Z', independently of one another, are β-sulfatoethyl, β-thiosulfatoethyl, β-phosphatoethyl, β-acyloxyethyl, β-haloethyl or vinyl.

4. A compound of the formula

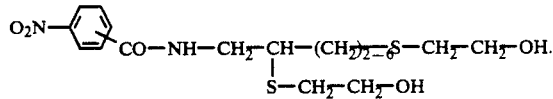

5. A compound according to claim 4, of the formula

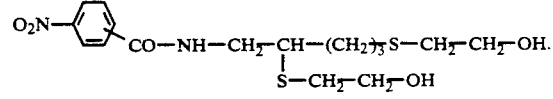

* * * * *